(12) United States Patent
Sullivan et al.

(10) Patent No.: US 9,248,492 B2
(45) Date of Patent: Feb. 2, 2016

(54) THERMAL TRANSFER PANELS WITH CHANNEL STRUCTURES AND METHOD OF USING THERMAL TRANSFER PANELS

(76) Inventors: Michael G. Sullivan, Vacaville, CA (US); Diane Reker, Vacaville, CA (US)

( * ) Notice: Subject to any disclaimer, the term of this patent is extended or adjusted under 35 U.S.C. 154(b) by 131 days.

(21) Appl. No.: 13/611,492

(22) Filed: Sep. 12, 2012

(65) Prior Publication Data

US 2014/0069605 A1  Mar. 13, 2014

(51) Int. Cl.
| | |
|---|---|
| B21D 39/06 | (2006.01) |
| B23P 15/26 | (2006.01) |
| F24H 9/06 | (2006.01) |
| B21D 47/00 | (2006.01) |
| F24F 5/00 | (2006.01) |
| F24D 3/12 | (2006.01) |
| F24D 3/14 | (2006.01) |
| E04C 1/39 | (2006.01) |
| F24D 13/02 | (2006.01) |
| E04F 13/08 | (2006.01) |

(52) U.S. Cl.
CPC ............... *B21D 47/00* (2013.01); *E04C 1/392* (2013.01); *F24D 3/127* (2013.01); *F24D 3/141* (2013.01); *F24D 3/142* (2013.01); *F24F 5/00* (2013.01); *E04F 13/0869* (2013.01); *F24D 13/024* (2013.01); *Y02B 30/26* (2013.01); *Y10T 29/49368* (2015.01); *Y10T 29/49629* (2015.01)

(58) Field of Classification Search
CPC ........ B21D 47/00; B21D 53/02; B21D 53/08; B21D 39/06; F24D 3/14; F24D 3/141; F24D 3/142; F24D 3/143; F24D 3/144; F24D 3/146

USPC .............. 29/890.04, 897.32; 165/49, 56, 168; 237/69

See application file for complete search history.

(56) References Cited

U.S. PATENT DOCUMENTS

| | | | | |
|---|---|---|---|---|
| 2,722,732 | A * | 11/1955 | Sandberg ................. | 29/890.038 |
| 4,120,284 | A * | 10/1978 | Cotsworth et al. ............ | 126/659 |
| 4,338,994 | A * | 7/1982 | Hewing et al. .................. | 165/49 |
| 4,646,814 | A * | 3/1987 | Fennesz .......................... | 165/56 |
| 5,454,428 | A * | 10/1995 | Pickard et al. .................. | 165/49 |
| 5,743,330 | A * | 4/1998 | Bilotta et al. ................. | 165/183 |
| 6,220,523 | B1 * | 4/2001 | Fiedrich ........................ | 237/69 |
| 6,270,016 | B1 * | 8/2001 | Fiedrich ........................ | 237/69 |
| 6,487,768 | B2 * | 12/2002 | Rhodes ........................ | 29/564.8 |
| 6,533,185 | B1 * | 3/2003 | Muir ............................. | 237/69 |
| 6,926,077 | B2 * | 8/2005 | Kuga et al. .................... | 165/170 |
| 6,969,832 | B1 * | 11/2005 | Daughtry, Sr. ................ | 219/531 |
| 7,021,372 | B2 * | 4/2006 | Pickard ......................... | 165/168 |
| 2004/0040693 | A1 * | 3/2004 | Fiedrich ........................ | 165/56 |

(Continued)

*Primary Examiner* — Alexander P Taousakis
(74) *Attorney, Agent, or Firm* — Robert D. Atkins; Patent Law Group: Atkins and Associates, P.C.

(57) ABSTRACT

A panel system has an insulating material with a first channel disposed over a surface of the insulating material. A transporter is disposed over the first channel. A thermal transfer medium is disposed over the surface of the first panel to attain desired surface characteristics. The first panel includes a second channel intersecting the first channel. A second panel includes a second channel. The first panel is adjacent to the second panel. The first and second channels of the adjacent first and second panels are aligned. The transporter is disposed over the first and second channels. The first and second panels are mounted over a mounting surface. Keyways are formed in the channels. Retention clips are disposed over the keyways. Panels include panel wings with hinges mounted over the panel wings. The thermal transfer medium includes graphite. The transporter includes tubing.

24 Claims, 20 Drawing Sheets

(56) References Cited

U.S. PATENT DOCUMENTS

| | | | |
|---|---|---|---|
| 2009/0101306 A1* | 4/2009 | Reis et al. | 165/56 |
| 2009/0314848 A1* | 12/2009 | Andersson | 237/71 |
| 2012/0267067 A1* | 10/2012 | Sullivan et al. | 165/56 |
| 2014/0116644 A1* | 5/2014 | Kaneko | 165/56 |
| 2014/0196867 A1* | 7/2014 | Tarraga Sanchez et al. | 165/49 |

* cited by examiner

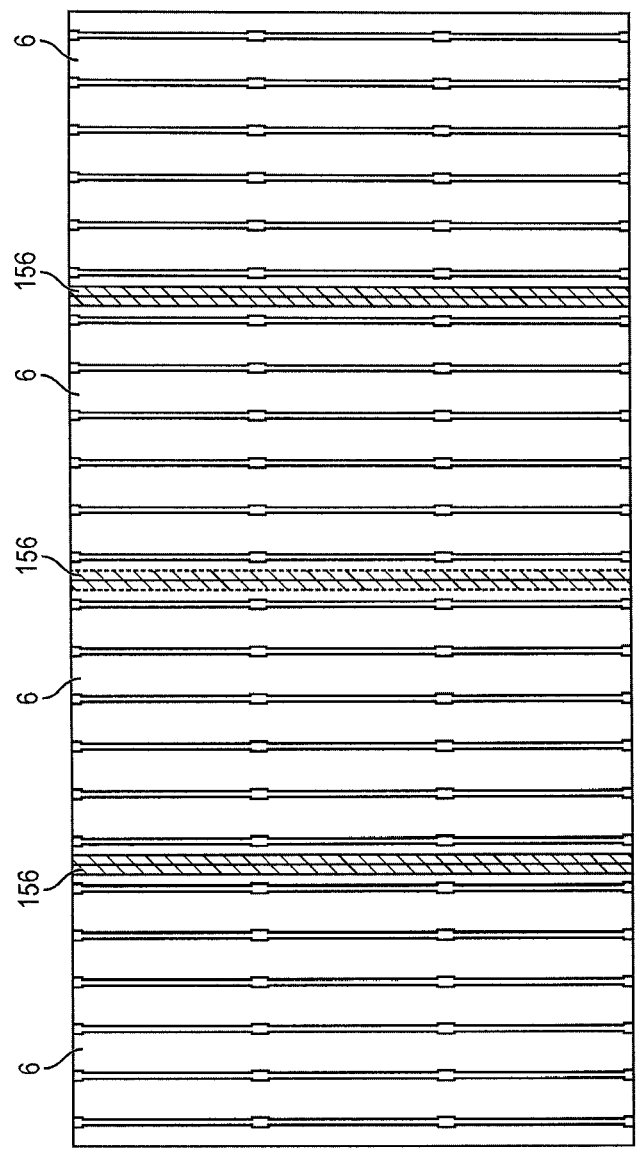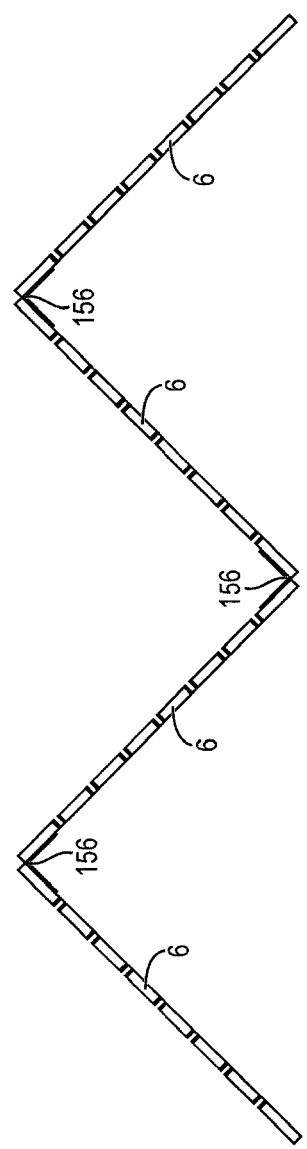
FIG. 6a
FIG. 6b

THERMAL TRANSFER PANELS WITH CHANNEL STRUCTURES AND METHOD OF USING THERMAL TRANSFER PANELS

FIELD OF THE INVENTION

The present invention relates in general to thermal transfer systems and, more particularly, to a panel system having channel structures and method of using the panel system.

BACKGROUND OF THE INVENTION

As the cost of energy continues to rise, increased emphasis is placed on alternative energy sources such as solar energy and wind energy. Increased emphasis is also placed on development of efficient, cost-effective methods of providing basic services such as heating and cooling.

Radiant heat transfer systems rely on energy transfer by emission of electromagnetic waves from a surface. Energy is released from an object in the form of electromagnetic waves. The waves propagate away from the emitting object and increase the energy level of any other objects that absorb the wave. Radiant heating systems rely at least in part on bodies absorbing electromagnetic waves in the infrared spectrum to increase temperature of the bodies. For example, a person standing outside in direct sunlight on a winter's day may feel comfortable without a coat while in the sunlight but feel much colder when standing in the shade despite identical ambient air temperatures.

In radiant heating systems, thermal energy radiates from a heated element such as a wall, floor, or overhead panel to heat people and objects in a conditioned space. Conversely, in radiant cooling systems, cooled elements in walls, floors, or ceilings can absorb thermal energy radiated from warmer objects and dissipate energy away from a conditioned space. Occupants can achieve thermal comfort despite uncomfortable air temperatures by using radiant cooling or heating. Radiant systems can result in significant savings relative to conventional forced air systems that rely on inefficiently passing air over heated or cooled coils and pumping the air into a conditioned space.

Heated or cooled elements can transfer heat energy to or from objects in contact with the elements by conduction. Conduction is the transfer of heat between objects in contact with one another. Heat can also be moved from one area to another by convection, using the movement of the liquid or gas to deliver or absorb heat. In air conditioning systems convection is used to deliver heating or cooling to a conditioned space by moving heated or cooled air into the space. In a radiant system, electromagnetic radiation plays a large role in delivering heat or cooling but conduction and convection still contribute to the system's overall performance. By utilizing radiation energy that would otherwise escape, a radiant system offers increased efficiency over traditional heating and cooling methods.

Radiant heating and cooling systems can be implemented using panels. Conventional heating and cooling panels contain pre-placed tubing. One disadvantage of conventional panels is that panels do not fit the variety of shapes and obstructions frequently encountered in many structures and cannot be easily modified. A building's design limits the area that the panels can cover. The incompatibility results in gaps in the radiant system.

Conventional panels also have a fixed tubing pattern that cannot be varied for different regions in the system. A hallway must be cooled or heated to the same extent as a bedroom. Efficiency decreases as unused areas are heated or cooled.

Conventional panels also have proprietary designs. Each manufacturer purposely designs panels that are compatible with the manufacturer's particular accessories such as the manufacturer's particular style of tubing or particular method of attachment.

SUMMARY OF THE INVENTION

A need exists for a panel system that facilitates ease of installation and manufacture of thermal transfer systems, low manufacturing cost, and increased efficiency. Accordingly, in one embodiment, the present invention is a panel system comprising a first panel including insulating material. A first channel is formed in a surface of the first panel. A transporter is disposed over the first channel. A thermal transfer medium is disposed over the surface of the first panel.

In another embodiment, the present invention is a panel system comprising an insulating material. A first channel is formed in a surface of the insulating material. A transporter is disposed over the first channel. A thermal transfer medium is disposed over the surface of the insulating material.

In another embodiment, the present invention is a panel system comprising a panel including insulating material. A first channel is disposed in a surface of the panel.

In another embodiment, the present invention is a method of making a panel system comprising the steps of providing a first panel and forming a first channel in a surface of the first panel.

BRIEF DESCRIPTION OF THE DRAWINGS

FIGS. 6a-6b illustrate multiple base delivery panels joined together by hinges;

DETAILED DESCRIPTION OF THE DRAWINGS

Figure 1A:
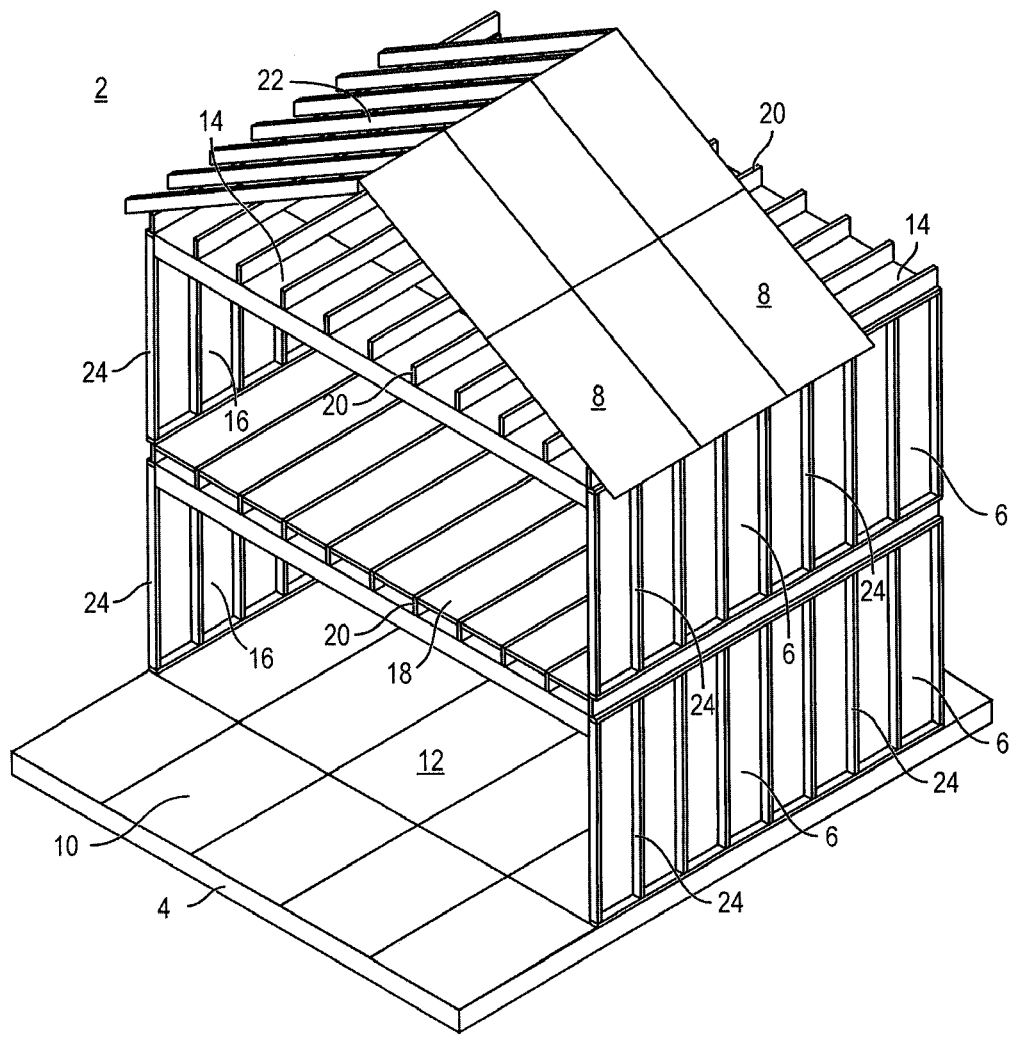
FIGS. 1a-1c illustrate a framed building structure, a concrete slab supporting the framed building structure, and a number of panels mounted to the framed building structure.

The present invention is described in one or more embodiments in the following description with reference to the figures, in which like numerals represent the same or similar elements. While embodiments are described in terms of the best mode for achieving the invention's objectives, those skilled in the art will appreciate that other embodiments may cover alternatives, modifications, and equivalents as may be included within the spirit and scope of the invention as defined by the appended claims and their equivalents as supported by the following disclosure and drawings.

In thermal conditioning systems, panels can increase the ease of installation. Panels also augment space efficiency inside of walls by providing a means for transporters to be routed through a panel rather than routed loose in a floor, wall, or ceiling. Transporters can include copper, aluminum, or other metallic pipes, plastic pipes, ducts, tubing, cross-linked polyethylene pipe (PEX tubing), non-cross linked pipe, PERT, HDPE, coaxial cable, fiber-optic cable, conduit, wiring, electrical heating elements, and associated junctions, connections, and terminations. For example, in hydronic radiant heating and cooling systems the transporter is frequently a tubing or pipe carrying a heated or cooled fluid. The fluid can include water, treated water, oils, anti-freeze, air, magnetic fluid, or other another fluid capable of thermal storage and flowing through a transporter. Transporters can also include structural reinforcing elements such as metal reinforcing bar or wooden dowels. Routing transporters through a panel also creates a more predictable and accessible system should repairs become necessary.

Panels are generally made of thermofusible expanded foam such as expanded polystyrene (EPS). Other types of thermofusible expanded foams suitable for use in panels include extruded polystyrene (XPS), polymethacrylimide low and high density rigid foam, flexible expanded polypropylene foam, polyisocyanurate foam, and polyurethane foam. When used in heating and cooling systems, the foam serves as an insulating barrier, limiting the loss of thermal energy to the rear and sides of panels to increase thermal efficiency. A highly breathable, reflective skin surfacing layer can be applied to the back side of a foam panel to act as a radiant barrier to reflect long-wave energy. The radiant barrier can be made of metallic or non-metallic material. Dry-mass materials are best for use in the panel system for rapid system response. The term dry-mass refers to materials that use no wetted components such as concrete, plaster, or gypsum concrete to transfer or hold thermal energy. Dry-mass materials include foams and other materials with a low specific heat that can respond rapidly to temperature changes allowing the system to be turned down to conserve energy and quickly recover when the system is reengaged. Although dry-mass panels are preferred, in some applications wet-mass panels with applied materials such as concrete, plaster, and gypsum concrete are used to provide thermal mass retention properties and support.

Panels can be manufactured by providing a foam slab and making appropriate cuts in the foam slab. Cuts into the surface of the slab define surface features such as channels. The channels can be cut using a hot wire foam cutter (HWFC), for example. A HWFC uses a hot metal wire to cut thermofusible expanded foams. As the hot wire passes through the foam, heat from the wire vaporizes material near the wire. HWFCs are often computer controlled and capable of making very precise cuts. The speed, precision, and programmability offered by HWFCs make HWFCs ideal for manufacturing panels for thermal heating and cooling systems. Channels can also be cut from surfaces of panels using conventional cutting tools such as saws, routers, or multi-axis CNC machines.

Panels can also be manufactured by foam injection molding. The process of foam injection molding involves injecting polystyrene beads into pre-formed molds under high temperature, pressurized conditions. Molds are removed after the polystyrene beads have solidified. When the molds are removed the completed panel mirroring the shape of the mold remains. Molds are shaped so that panels have the desired channel configuration, shape, and size. Foam injection molding also enables a manufacturer to position objects such as retention clips, transporters, or transporter joints within a mold before injecting foam.

FIG. 1a illustrates a building structure 2 resting on concrete slab 4 and the installation of panels 6-18 on building structure 2 and concrete slab 4. An exterior portion of concrete slab 4 is an outdoor surface such as a driveway or a sidewalk. Framed building structure 2 includes horizontally-oriented joists 20 to form ceilings and floors. The roof of framed building structure 2 is supported by rafters 22. Vertically-oriented studs 24 form walls of framed building structure 2. Panels 6 are affixed to an interior wall portion of studs 24 and used to implement a heating or cooling system. Panels 8 are mounted to the exterior of rafters 22 and used to implement a solar energy collection or night sky cooling system. Panels 10 are affixed to an exterior floor portion of concrete slab 4 and used to implement a system for melting snow and ice accumulated on an exterior portion of concrete slab 4. Panels 12 are affixed to an interior floor portion of concrete slab 4 and used to implement a radiant heating or cooling system. Panels 14 are mounted to an interior ceiling portion of joists 20 and used to implement a radiant heating or cooling system. Panels 16 are mounted to an exterior wall portion of stud 24 and are used to implement a form for a poured concrete retaining wall. Panels 18 are mounted between joists 20 on the second floor to implement a radiant heating or cooling system.

Figure 1B:
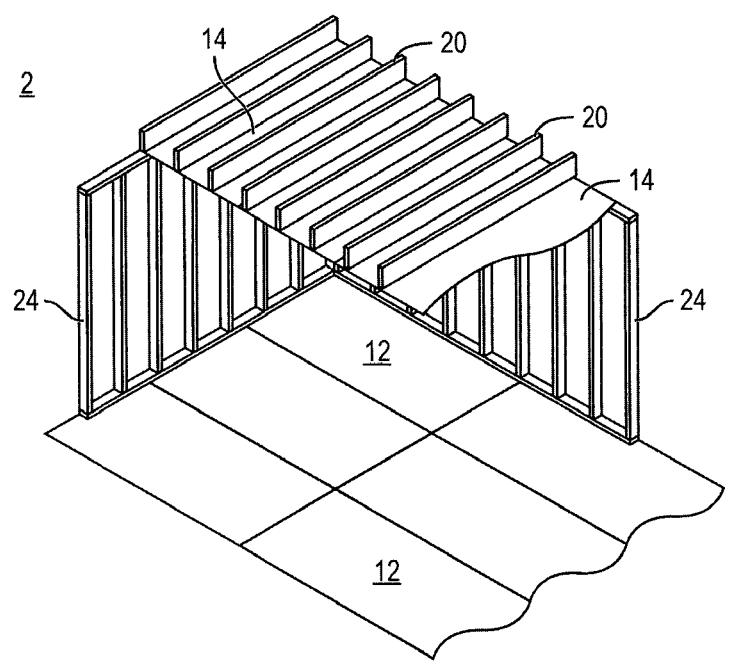

FIG. 1b is a cut-away diagram further illustrating a portion of framed building structure 2 in greater detail. Panels 14 are mounted to an underside of joists 20 to implement a radiant heating or cooling system on an interior ceiling. Panels 12 are mounted over an existing concrete slab or a wood subfloor and over poured with an additional layer of concrete to implement a radiant heating or cooling system on an interior floor. Panels 12 can also be directly placed on an existing subgrade, made of earth, sand, or rock, and poured over with concrete, gypsum concrete, or other wet-mass material. Panels 6-18 are modular in nature. Panels 6-18 have a standardized shape and size and are arranged edge-to-edge in order to cover a large area easily. Panels made from foam can be cut to fit into an area of any shape, greatly increasing system flexibility.

Figure 1C:
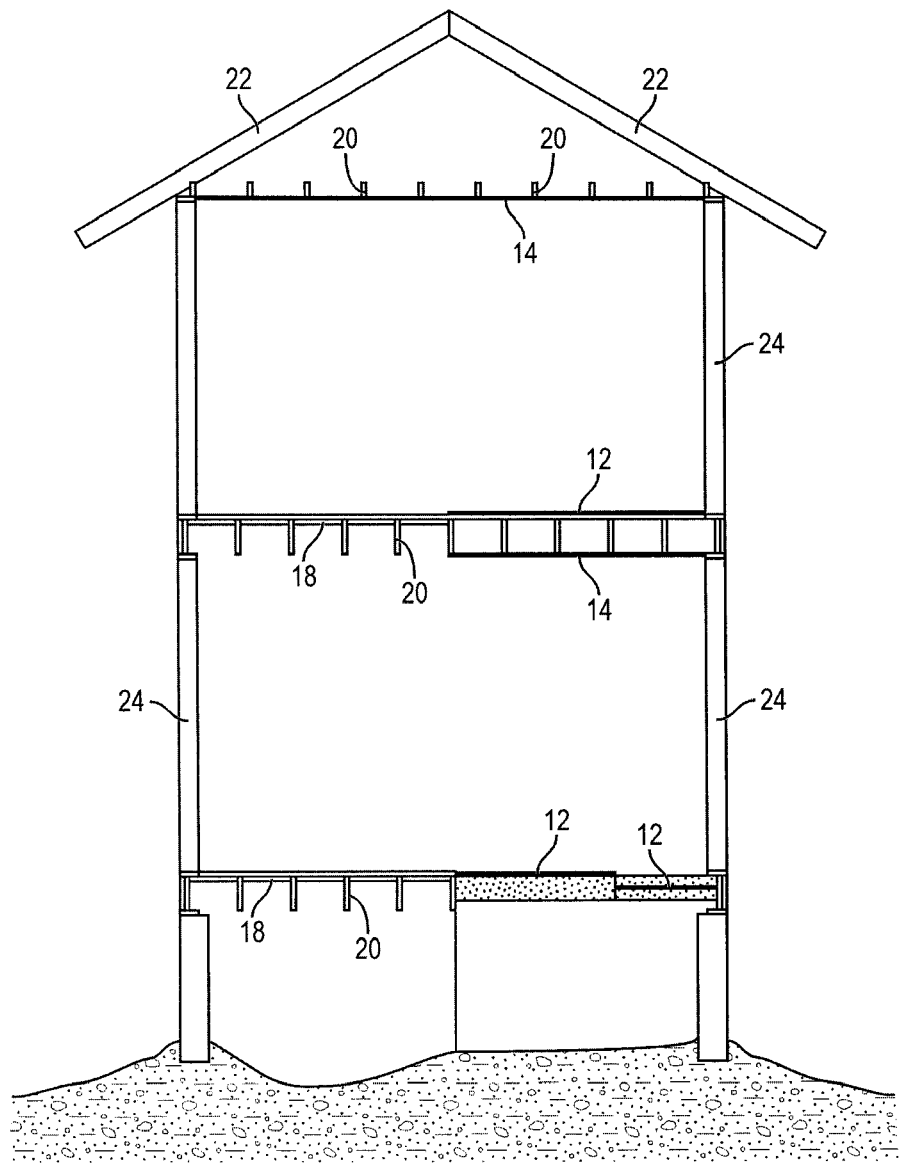

FIG. 1c is a two dimensional view of framed building structure 2 showing various ceiling and floor installation configurations for panels 12-18 implementing a radiant heating and cooling system. Panels 18 are installed beneath the subfloor on the first floor of the structure just above a crawl space or basement. Panels 12 are installed above a concrete layer on the first floor and can have an additional concrete layer applied over the top of panels 12. Panels 12 can also be installed above the second-floor prior to floor coverings. Panels 14 are mounted on the ceiling of the first and second floors prior to drywall or other ceiling material being installed. Panels 18 are installed between joists 20 above the first-floor ceiling and below the second floor.

Figure 2A:
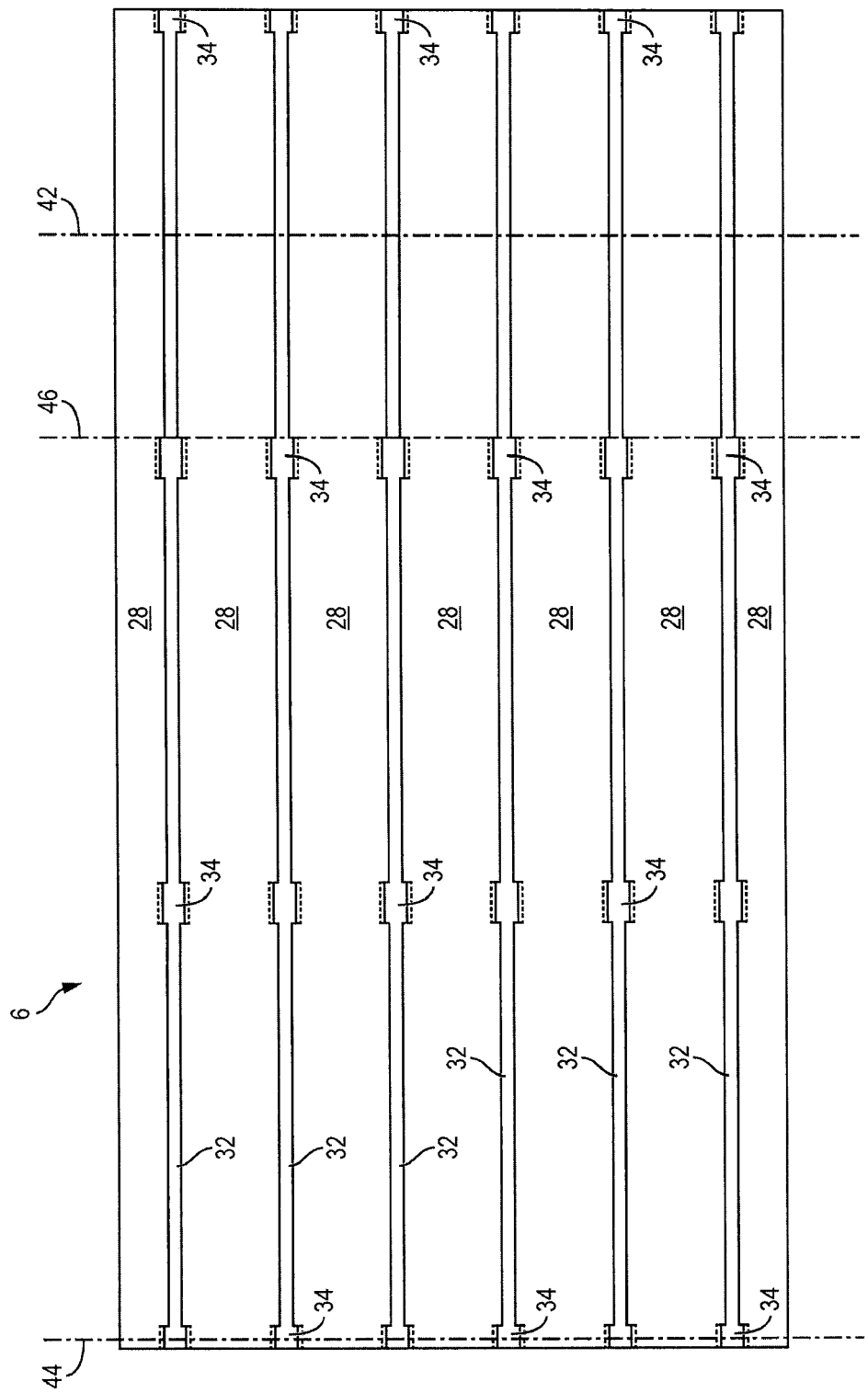
FIGS. 2a-2d illustrate a base delivery panel.

FIG. 2a provides a plan view of panel 6 in greater detail. The overall shape of panel 6 is substantially square. Generally, a rectangular or square shape for panel 6 is more convenient due to an abundance of straight lines and right angles in modern building design. However, an overall shape of panel 6 may be something other than rectangular or square, e.g., circular, trapezoidal, or hexagonal. The dimensions of panel 6 are approximately four feet (48 inches) lengthwise by two feet (24 inches) breadthwise but other panel sizes are contemplated.

Panel 6 is composed primarily of thermofusible expanded foam such as expanded polystyrene (EPS). Other types of thermofusible expanded foams suitable for use in panel 6 include extruded polystyrene (XPS), polymethacrylimide low and high density rigid foam, flexible expanded polypropylene foam, polyisocyanurate foam, and polyurethane foam. Although thermofusible expanded foam such as EPS is preferred, panel 6 can be constructed using any thermally insulating material. When used in heating and cooling systems, the insulating material limits the loss of thermal energy to the rear of panel 6. The thermal insulating materials create a physical barrier limiting the movement of air and heat loss due to convection. As a result, load conditions are reduced and energy efficiency is enhanced. Surface 28 of panel 6 is coated with an emitter material or thermal transfer medium such as metal, wood, plastic, graphite, expanded graphite, graphite conductive polymer, graphite conductive gel, polymer, thermal transfer pastes, thermal transfer films, or other mediums to improve heating and cooling performance by altering the surface characteristics of panel 6. A transporter placed into panel 6 contacts the emitter material. In heating and cooling applications the surface material is selected to enhance the thermal absorption or emission of panel 6.

Panel 6 contains a set of channels 32 running from one end of panel 6 to another. Channels 32 are indentations cut into the upper surface 28 of panel 6 to receive a transporter. Channels 32 are parallel and substantially straight but nonlinear shapes can be used for channel 32. The distance between consecutive channels 32 is substantially equal but can be varied. The straight, parallel channel configuration with equally spaced channels 32 shown in FIG. 2a is advantageous in heating and cooling systems because the configuration allows for even distribution of heating or cooling throughout panel 6. Other configurations of channels 32 are beneficial where an even heating or cooling distribution is unimportant or in applications other than heating and cooling such as cable management or structural support. The shape of channel 32 is chosen so that the contour of channel 32 accepts a transporter placed into panel 6. When a transporter is inserted into channel 32 the transporter is largely surrounded by channel 32 so convective air currents cannot wash away thermal energy. For example, when the transporter is PEX tubing channels 32 have a circular contour and are generally between 5/16-inches and one-inch across. Channels 32 can be wider or narrower and have different contours depending on the size and shape of the transporter to be fitted in panel 6. When a transporter is installed in panel 6, channels 32 have extensive surface contact with the transporter. Thermal energy can be transferred along the panel to or from the transporter. Channels 32 have a snug fit with the transporter to hold the transporter securely in panel 6.

Keyways 34 are spaced at intervals along channels 32 and at the ends of channels 32. Keyways 34 located at ends of channels 32 are shorter than keyways 34 located along the interior of panel 6. Keyways 34 have a different contour than channels 32. The contour of keyways 34 is selected so that keyways 34 can receive material or components such as adhesive material, a transporter joint, or a clip in addition to allowing a transporter to pass through keyway 34. In panel 6, keyways 34 are configured to receive a rectangular clip as well as a transporter. Keyways 34 have a rectangular shape when viewed from above in FIG. 2a and are oriented so that the long sides of keyways 34 are parallel to channel 32 and the short sides of keyways 34 are perpendicular to channel 32. Cross sections taken along lines 42, 44, and 46 illustrate the shape of channels 32 and keyways 34 in greater detail. Panel 6 can also be configured to accept a transporter solely in channels 32 and omit keyways 34 in systems that do not require an additional material or component inserted into keyways 34.

Figure 2B:
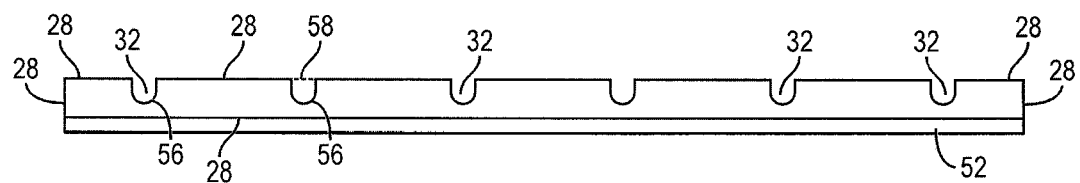

FIG. 2b shows a cross section of panel 6 taken along line 42 illustrating the contour of channels 32. Panel 6 has surface 28 that is substantially flat along the top surface of panel 6 except for channels 32. Panel 6 is shown with optional substrate 52 adjacent to the bottom surface of panel 6 for support. Channels 32 are inferior to upper portion of surface 28 and have channel surface 56 with a semicircular shape at the bottom of channel 32. Vertical sidewalls of surface 56 intersect with surface 28 of panel 6 at angles near 90 degrees. The surface 56 of channels 32 can also have sloped sidewalls intersecting surface 28 at an acute or obtuse angle depending on the desired interface between channel 32 and a transporter. Channels 32 have an opening 58 parallel to surface 28 of panel 6 and substantially planar with upper portion of surface 28. The flat configuration of surface 28 promotes ease of manufacturing, shipping, and installation. Upper surface 28 can also have a convex, concave, wave-shaped, or other shaped surface. Channels 32 are spaced at uniform intervals across a width of panel 6 and have a uniform depth and shape. Uniform spacing between channels 32 and channel depth is chosen for system design flexibility and ease of manufacturing but other embodiments need not space channels 32 evenly or implement uniform channel depths and contours.

Figure 2C:
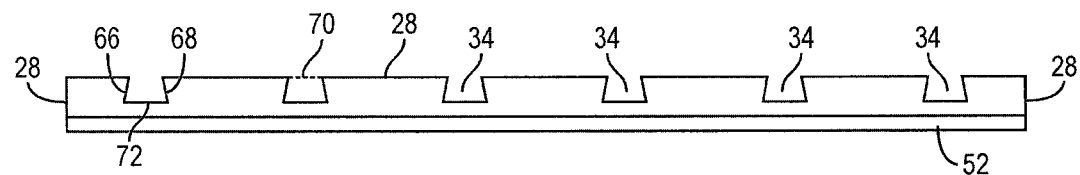

FIG. 2c is a cross sectional view of panel 6 taken along line 44 to illustrate the profile of keyways 34 in greater detail. Panel 6 has upper surface 28 that is substantially flat except for trapezoid-shaped keyways 34. The upper portion of surface 28 is shown flat for ease of manufacturing, shipping, and installation but upper surface 28 can also have a convex, concave, or wave-shaped profile for example. Keyways 34 are spaced at uniform intervals across a width of panel 6. Uniform spacing between keyways is chosen for system design flexibility and ease of manufacturing but other embodiments need not space keyways 34 evenly. Optional substrate material 52 is shown adjacent to the back surface of panel 6. Keyway 34 is undercut with sides 66 and 68 of keyway 34 intersecting surface 28 at acute angles. Opening 70 of keyway 34 is flat and coplanar with surface 28. Bottom surface 72 is flat and parallel with surface 28. Bottom surface 72 is longer than opening 70 so that sidewalls 66 and 68 can stabilize a system component placed in keyway 34. Side surfaces 66 and 68 can intersect surface 28 at other angles to facilitate reception of different shaped components such as transporter joints, clips, or adhesive material.

Figure 2D:
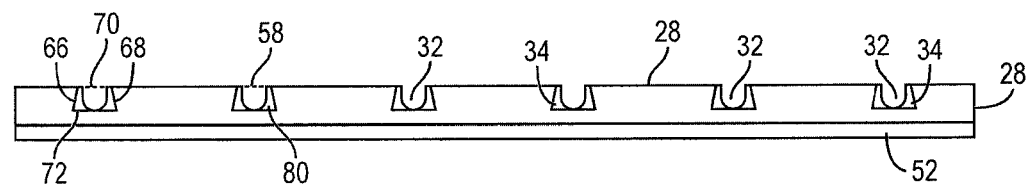

FIG. 2d is a cross sectional view of panel 6 along line 46 illustrating the connections between channel 32 and keyway 34. Opening 58 of channel 32 is smaller than opening 70 of keyway 34 so that surface 56 of channel 32 is contained within side surfaces 66 and 68, opening 70, and bottom surface 72 of keyway 34. The area between surface 56 of channel 32 and surfaces 66, 68, and 72 of keyway 34 forms vertical surface 80 with a planar contour oriented substantially orthogonal to upper surface 28. Channel 32 is roughly centered in keyway 34 with the distances between side surfaces 66 and 68 of keyway 34 and surface 56 of channel 32 being similar. The joint depicted in FIG. 2d is present at points on panel 6 where channels 32 meet with keyways 34. There are two joints between channel 32 and keyway 34 for every keyway located in the internal portion of panel 6 and one joint between channel 32 and keyway 34 for every keyway 34 adjacent to an edge of panel 6.

Figure 3A:
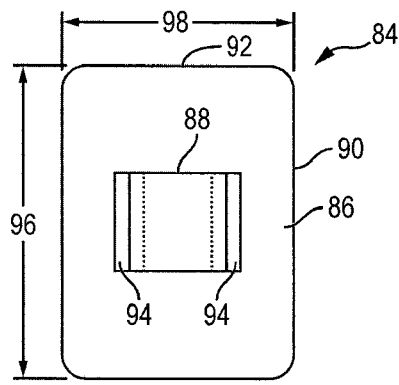
FIGS. 3a-3e illustrate a retention clip installed in a base delivery panel.
Figure 3B:
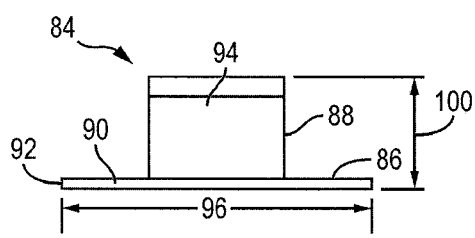

FIG. 3a shows retention clip 84 from a plan view. Clip 84 has rectangular base 86 and clip mechanism or retaining member 88. Base portion 86 has two parallel sides 90 and two parallel sides 92. Clip mechanism 88 joins base 86 at the center so that clip mechanism 88 has two arms 94 with opposite shapes and similar sizes, both protruding upward from base 86 on opposite halves of clip mechanism 88. Clip 84 has length 96 on side 90 and width 98 on side 92. When viewed from above, arms 94 of clip mechanism 88 have outer edges that are parallel to sides 90 and perpendicular to sides 92 so that a straight transporter placed into clip 84 also runs parallel to side 90. Arms 94 curve inward towards the center of clip 88 at the sections nearest base 86. FIG. 3*b* shows clip 84 viewed from side 90. Arms 94 of clip mechanism 88 have surfaces extending up from base 86 to the top of clip mechanism 88. The top of clip mechanism 88 extends to height 100 from the bottom surface of base 86. Base 86 is relatively thin compared to height 100 with arms 94 of clip mechanism 88 being the primary contributors to height 100. Clip mechanism 88 is shorter than length 96 in the direction of side 90 so that base 86 extends beyond both lateral ends of clip mechanism 88.

Figure 3C:
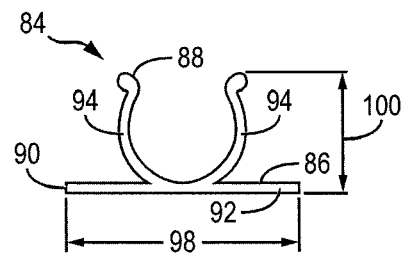

FIG. 3*c* shows clip 84 viewed from side 92 of base 86. Clip mechanism 88 has a horseshoe-shaped profile with arms 94 having a round, concave surface facing towards the center of clip mechanism 88. The distance between arms 94 at both the top and bottom of clip mechanism 88 is shorter than the distance between the arms at an intermediate height along clip mechanism 88. Arms 94 come together where base 86 joins clip mechanism 88. Arms 94 of clip mechanism 88 are similar in thickness to base 86 with both arms 94 and base 86 having a small amount of flexibility. When a transporter is inserted into clip 84, the widest section of a round transporter initially pushes the top ends of arms 94 apart, causing clip 84 to flex slightly. Once the widest portion of the transporter passes the narrow opening at the top of clip 84, arms 94 return toward the original position and hold the transporter in place. To remove the transporter from clip 84, arms 94 must be moved apart to allow the transporter to pass the narrow opening at the top of clip mechanism 88. The shape and size of base 86 are selected so that clip 84 can insert into keyways 34 of panel 6 and be held in place by sidewalls 66 and 68.

Figure 3D:
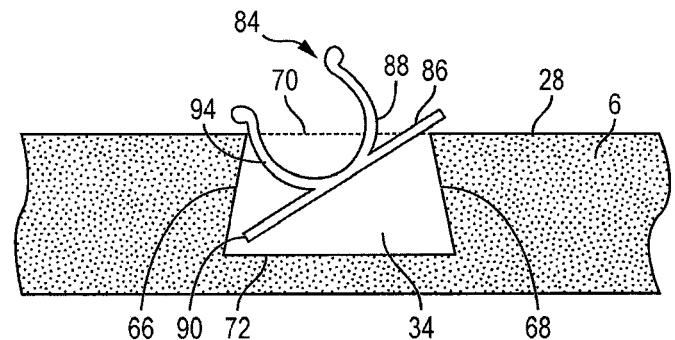
Figure 3E:
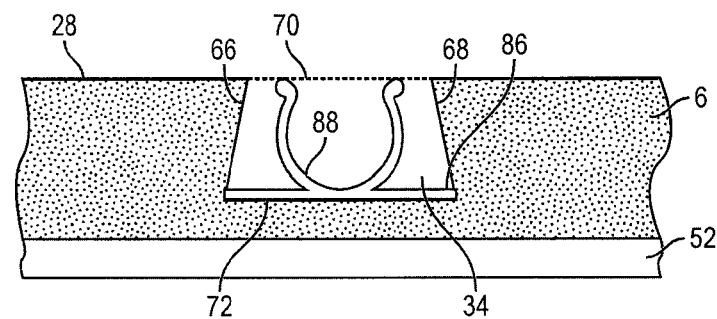

FIG. 3*d* shows insertion of clip 84 into keyway 34 of panel 6. Width 98 of clip 84 is selected to make opening 70 shorter than width 98 so that clip 84 cannot be inserted or removed when side 92 is parallel to surface 72 of keyway 34. Base 86 of clip 84 is inserted so that the long side 90 of base 86 is pressed toward the corner created by side surface 66 and bottom surface 72 of keyway 34. The corner created by surfaces 66 and 72 can have a notch portion removed to increase the stability of clip 84 inside of keyway 34. The distance from the corner created by surfaces 66 and 72 to the end of opening 70, which is marked by the intersection of opening 70 and surface 68, is approximately equal to width 98 so that the elevated end of clip 84 can be lowered into keyway 34. Base 86 of clip 84 is slightly flexible so that the edges of base 86 can be curved upward giving side 92 a slight U shape for additional clearance during insertion. Edges of base 86 can be flexed upward using clip mechanism 88 by pinching arms 94 inward. Once the edge of base 86 is passed opening 70, any flex in clip 84 is released so that clip 84 lies flat in keyway 34 against surface 72. Side surfaces 66 and 68 prevent clip 84 from falling out of keyway 34. FIG. 3*e* shows clip 84 securely lodged in keyway 34 with the bottom surface of base 86 flat and parallel to bottom surface 72 of keyway 34. Sides 66 and 68 of keyway 34 engage base 86 of clip 84 so that removing the clip from keyway 34 requires the ends of base 86 to be flexed slightly away from clip mechanism 88 into an upside-down U shape. During removal, one end of base 86 is lifted to place clip 84 in an intermediate position similar to FIG. 3*d*. While inserted, clip mechanism 88 lines up with channel 32 at the end of keyway 34 so that a transporter lodged in channel 32 is secured to panel 6 by clip 84. Clips 84 can be inserted into keyways 34 at the ends of channels 32 by aligning base 86 of clip 84 with surface 72 of keyway 34 and sliding clip 84 into keyway 34 so that bottom surface of base 86 slides along surface 72 of keyway 34.

Figure 4:
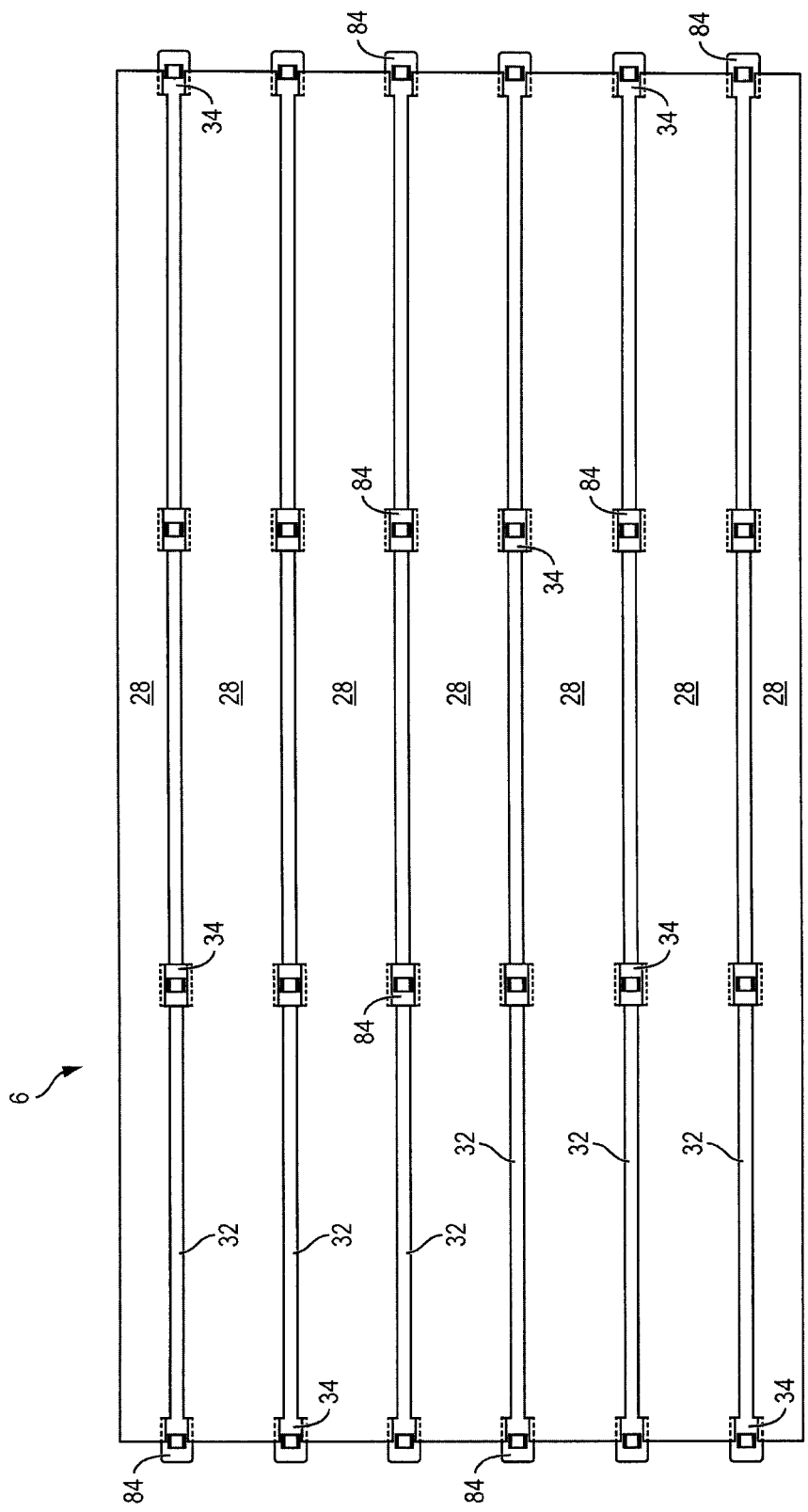
FIG. 4 illustrates a base delivery panel with several retention clips installed.
Figure 5A:
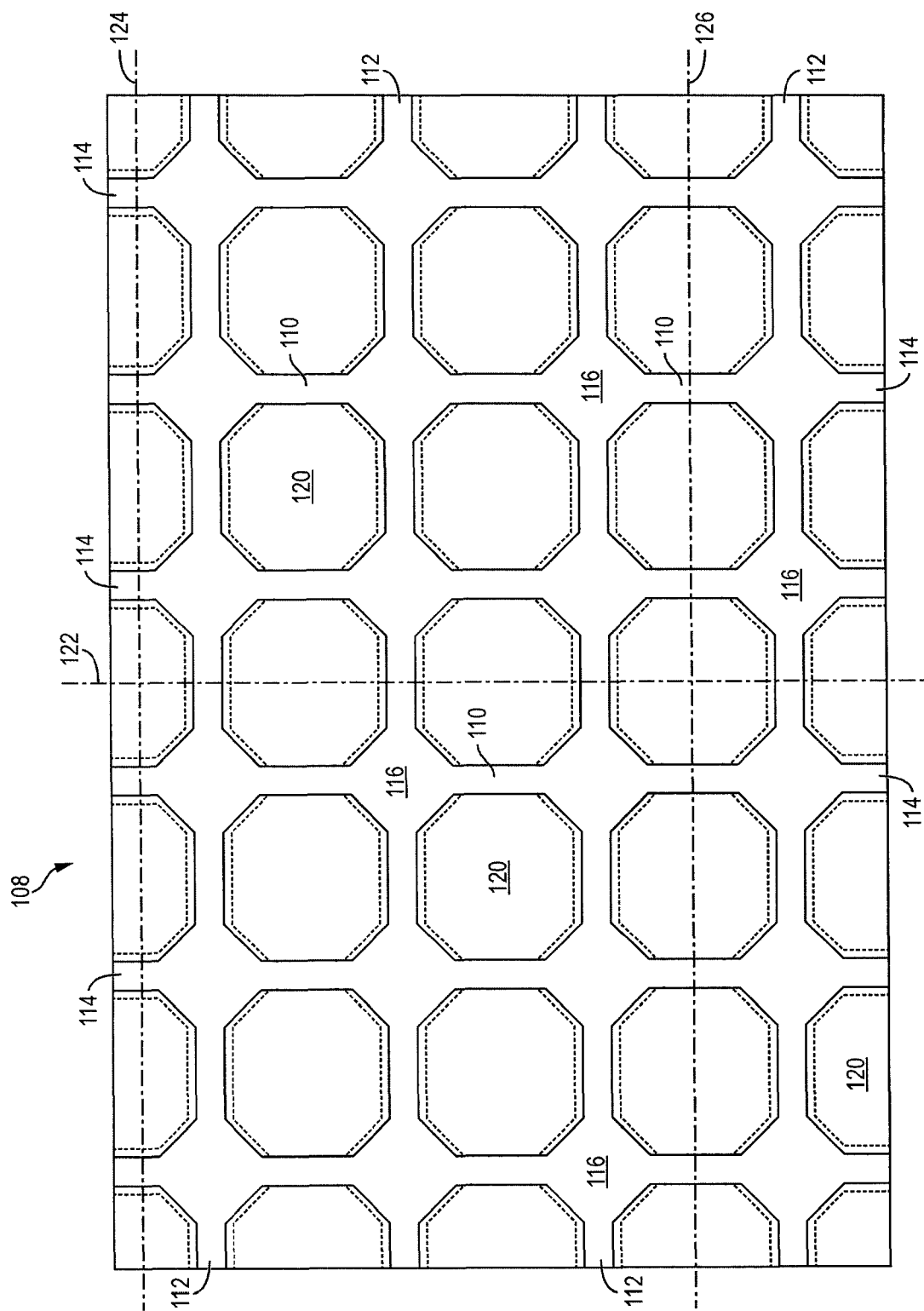
FIGS. 5a-5d illustrate a directional change panel.

Panel 6 is shown with several clips 84 inserted into keyways 34 in FIG. 4. Clips 84 are shown in each keyway 34 in panel 6, but some keyways 34 can be left empty to promote faster installation in applications where less transporter stability is required. Clip mechanisms 88 of clips 84 align with channels 32 so that a transporter inserted into the length of a channel 32 continues substantially straight through keyway 34 with a portion of the transporter held in place by clip 84. Clips 84 located in keyways 34 at the ends of channels 32 and adjacent to the edge of panel 6 are oriented so that approximately half of the clip is protruding from the edge of panel 6. The protruding portion of clip 84 connects panel 6 to another panel by inserting the protruding portion of clip 84 into a keyway or channel shaped similar to keyway 34. The protruding portion of clip 84 lodges into the adjoining panel so that both panels hold half of clip 84 by pressing the sidewalls of the channel or keyway against the edge of clip 84. Panel 6 may be attached to another delivery panel 6 or directional-change panel 108, as shown in FIG. 5*a*.

The overall shape of panel 108 is substantially rectangular. Generally, a rectangular or square shape for panel 108 is convenient due to an abundance of straight lines and right angles in modern building design. However, in alternative embodiments an overall shape of panel 108 may be different than rectangular. In FIG. 5*a*, dimensions of panel 108 are about two feet (24 inches) lengthwise by one foot and four inches (16 inches) breadthwise but other panel sizes are contemplated. Sizes and configurations of panel 108 are selected to facilitate easy interfacing with panel 6 and ease of installation.

Panel 108 is composed primarily of thermofusible expanded foam such as expanded polystyrene (EPS). Other types of thermofusible expanded foams suitable for use in panel 108 include extruded polystyrene (XPS), polymethacrylimide low and high density rigid foam, flexible expanded polypropylene foam, polyisocyanurate foam, and polyurethane foam. Although a thermofusible expanded foam such as EPS is preferred for panel 108, other example embodiments may utilize any insulating material. When used in heating and cooling systems, the insulating material acts as an insulation layer that limits the loss of thermal energy to the anterior and sides of panel 108. In addition, the insulating material acts as an infiltration barrier and limits the movement of air currents through the panel. The surface of panel 108 is coated with a thermal transfer material such as metal, wood, plastic, graphite, polymer, expanded graphite, graphite conductive polymers, graphite gels, thermal transfer paste or film, or other material to improve heating and cooling performance by altering the surface characteristics of panel 108. In heating and cooling applications the surface material is selected to enhance the thermal absorption or emission of panel 108 by facilitating thermal exchange with a transporter.

Panel 108 contains first channels 110 running along the interior portion of panel 108. First channels 110 are straight and parallel to one another and are also parallel to two sides of panel 108. Channels 110 have a contour similar to channels 32 to hold a similar transporter. Second channels 112 intersect first channels 110 and extend from one end of panel 108 to an opposite end of panel 108. Second channels 112 can have different width than first channels 110 and have undercut sidewalls throughout the length of channels 112. The sidewalls of second channels 112 are similar to sidewalls 66 and 68 of keyways 34. First channels 110 have end segments 114 that are similar in shape and depth to second channels 112.

Segments 114 are wider than channel 110 and have undercut sidewalls similar to sidewalls 66 and 68 of keyways 34. First channels 110 and second channels 112 meet at intersections 116 throughout panel 108. Intersections 116 are set into panel 108 and have a diamond shape that is partially bounded by four undercut sidewalls. The sidewalls are undercut to hold clips 84 in place or support a turning segment of a transporter. The sidewalls intersect with channels 110 and 112 at approximately 45 degree angles. Islands 120 are bounded by first channels 110, second channels 112, segments 114, and intersections 116. The top surfaces of islands 120 define the top surface of panel 108. Clips 84 can be placed between islands 120 to hold a transporter at any point in panel 108. Clips 84 can provide support for a transporter at locations where shear forces exerted by the turning transporter are greatest. To install clips 84 into panel 108 clips can be laid flat in intersection 116 and slid into channel 112 or segment 114.

Figure 5B:
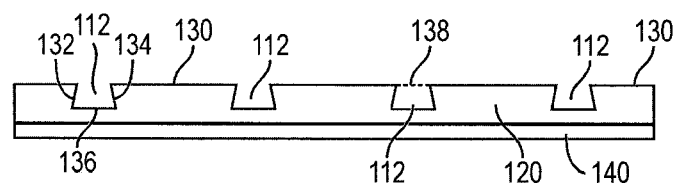

FIG. 5b shows a cross section of panel 108 taken along line 122. Panel 108 has an upper surface 130 that is substantially flat except for second channels 112. Upper surface 130 is shown flat for ease of manufacturing, shipping, and installation but upper surface 130 can also have a convex, concave, or wave-shaped profile. Second channels 112 are spaced at uniform intervals across a width of panel 108. Uniform spacing between second channels 112 is chosen for system design flexibility and ease of manufacturing but even spacing is not required. Second channel 112 is undercut with sides 132 and 134 of channel 112 intersecting surface 130 of panel 108 at acute angles. Channel 112 has an undercut profile with bottom surface 136 longer than opening 138 so that sidewalls 132 and 134 stabilize clip 84 within channel 112. Sides 132 and 134 can intersect surface 130 at other angles to facilitate reception of different shaped components such as transporter joints, other clips, or adhesive material. Opening 138 of second channel 112 is flat and coplanar with surface 130. Bottom surface 136 is flat and parallel with surface 130. Optional substrate material 140 is shown adjacent to the back surface of panel 108.

Figure 5C:
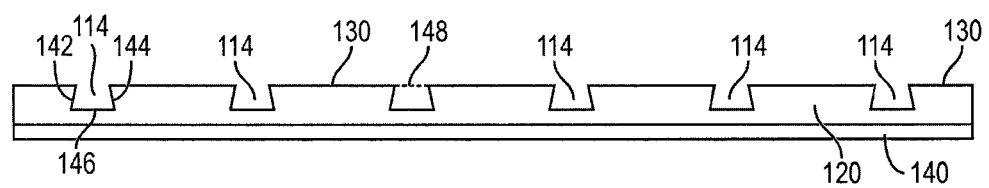

FIG. 5c is a cross-sectional view of panel 108 taken along line 124 of FIG. 5a to illustrate the profile of segments 114 in greater detail. Panel 108 has upper surface 130 that is substantially flat except for trapezoid-shaped segments 114. Segments 114 are spaced at uniform intervals across a width of panel 108. The spacing of segments 114 matches the spacing of channels 110 so that channels 110 and segments 114 align in a linear manner with segments 114 at either end of channel 110 and adjacent to an edge of panel 108. Segment 114 is undercut with sides 142 and 144 of segment 114 intersecting surface 130 of panel 108 at acute angles. Segment 114 has an undercut profile with bottom surface 146 longer than opening 148 so that sidewalls 142 and 144 can stabilize clip 84 within segment 114. Sides 142 and 144 can intersect surface 130 at other angles to facilitate reception of different shaped components such as transporter joints, other clips, or adhesive material. Opening 148 of segment 114 is flat and coplanar with surface 130. Bottom surface 146 is flat and parallel with surface 130.

Figure 5D:
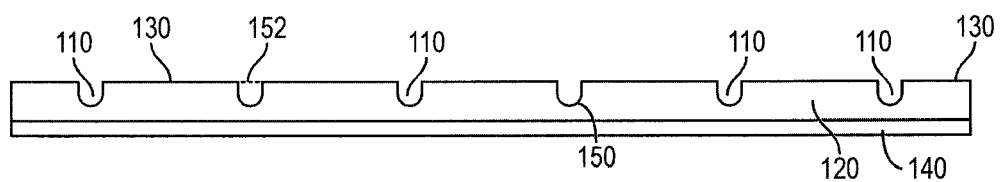

FIG. 5d shows a cross section of panel 108 taken along line 126 of FIG. 5a illustrating the contour of channels 110 in greater detail. Panel 108 has a surface 130 that is substantially flat except for channels 110. Panel 108 is shown with optional substrate 140 adjacent to the bottom surface of panel 108 for support. Channels 110 are cut into surface 130 and have surface 150 with a semicircular shape at the bottom of channel 110 and vertical sidewalls intersecting with surface 130 of panel 108 at approximately right angles. Surface 150 of channels 110 can also have sloped sidewalls so that the sidewalls intersect surface 130 at acute or obtuse angles. Channels 110 have opening 152 parallel to surface 130 of panel 108. Opening 152 at the top of channel 110 is roughly coplanar with the surface 130 of panel 108. The flat configuration promotes ease of manufacturing, shipping, and installation. Upper surface 130 can also have an uneven surface with a convex, concave, or wave-shaped profile. The bottom portion of surface 150 forms a half circle in panel 108 to facilitate ease of installation of a transporter. The shape of channel 110 is chosen to receive and hold a round transporter such as PEX tubing, pipe, rebar, or a wooden dowel. Channels 110 are spaced at uniform intervals across a width of panel 108 and have a uniform depth and shape. Uniform spacing between channels 110 and channel depth is chosen for system design flexibility and ease of manufacturing reasons but other embodiments need not space channels 110 evenly or use uniform channel depths.

FIG. 6a illustrates multiple panels 6 joined together to provide ease of transportation and ease of installation. Panels 6 are aligned so that a short edge of each panel 6 is adjacent to a short edge of another panel 6. The edges of panel 6 are then joined using a hinge 156, which could be a tape, metal, foam, or other type of hinge. Hinge 156 is attached so that each alternating joint between panels 6 folds in the opposite direction of the next joint, as shown in FIG. 6b. Joined panels 6 are shipped in a folded configuration. During installation, joined panels 6 are configured against a wall, ceiling, floor, or desired installation surface in an unfolded configuration, as shown in FIG. 6a. The connected panels 6 enable installers to install more panels 6 using fewer fasteners to hold panels against the desired surface. Joined panels 6 also enable installers to install panels 6 over a large surface area quickly by providing aligned panels in the desired configuration.

Figure 7A:
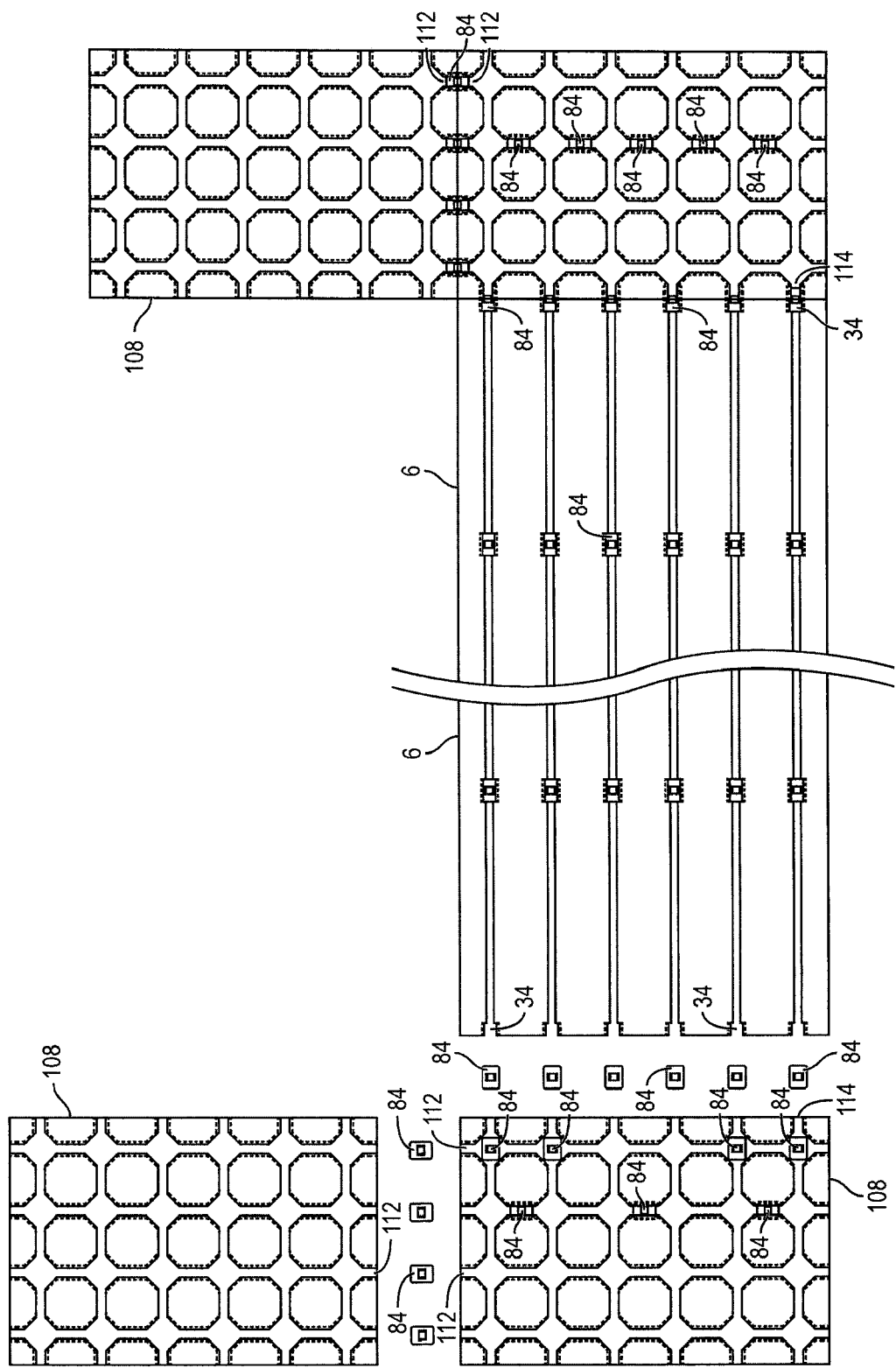
FIGS. 7a-7b illustrate the installation of a thermal transfer system implemented with multiple base delivery panels and directional change panels.
Figure 7B:
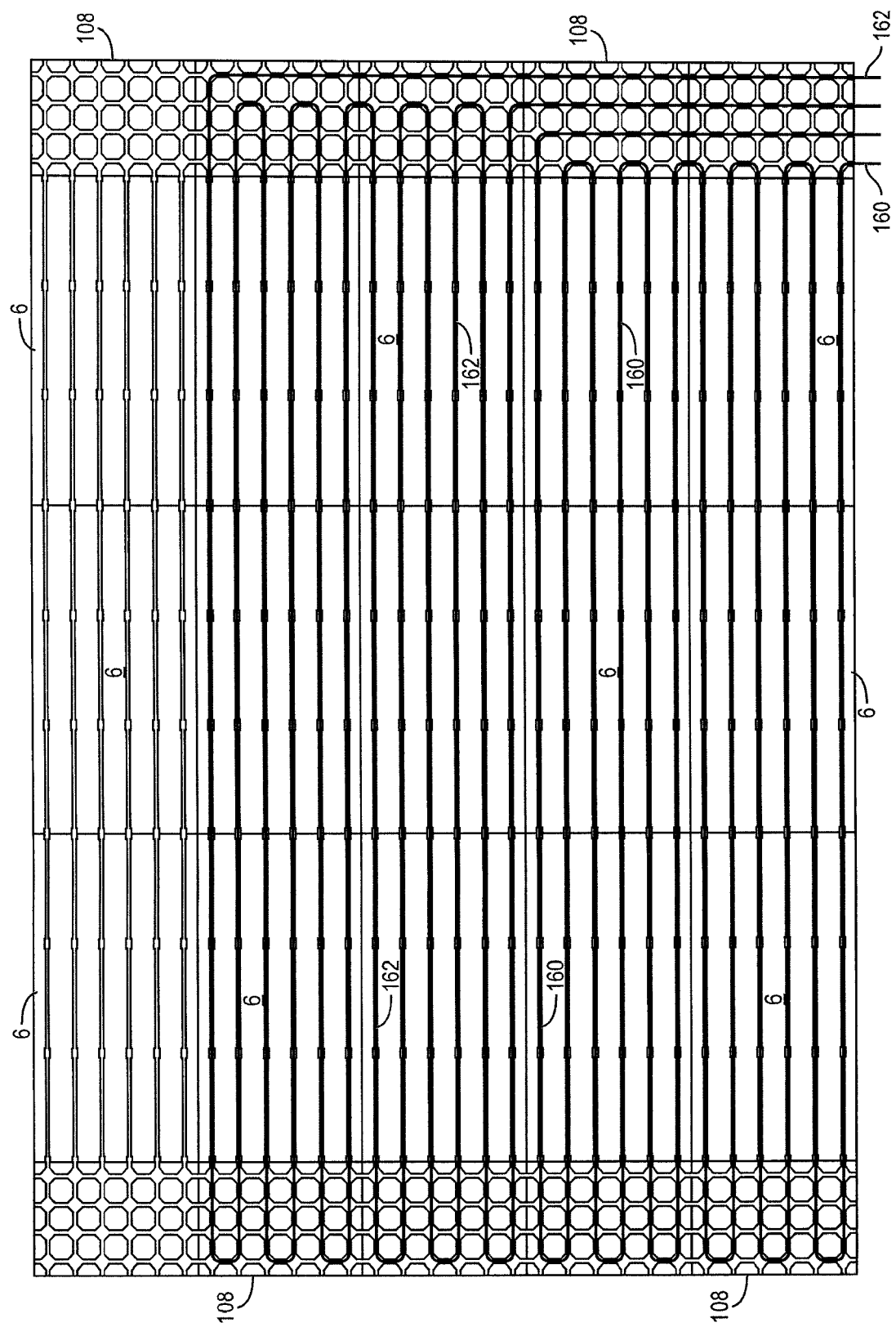

FIG. 7a depicts the method of installing panels 6 on a surface such as a wall or ceiling. Panels 6 are mounted against the desired mounting surface using screws, nails, adhesive, tape, pressure, or other appropriate fasteners. Clips 84 are placed into keyways 34 as desired on panel 6. Another panel 6 is aligned at the end of panel 6 so that keyways 34 on both panels 6 receive a portion of clip 84. Panels 6 are added onto the ends of other panels 6 by depositing a portion of clip 84 in keyways 34 on adjacent edges of both panels 6. When the desired area is covered by base delivery panels 6 and the transporter must turn, panels 108 are joined to panel 6. Panels 108 are attached to panels 6 by aligning the panels so that keyways 34 of panel 6 match up with segments 114 of abutted panel 108. Clips 84 are placed into the keyways 34 and segments 114 so that adjacent keyways 34 and segments 114 each contain a portion of a clip 84. Panels joined by clips 84 are stabilized and can also be fastened to a surface, if desired, using screws, nails, adhesive, tape, pressure, or other appropriate fasteners. Once panels 6 and 108 have been installed on the desired surface with clips 84, a transporter is inserted into channels 32, 110, and 112 and clips 84, as shown in FIG. 7b.

Panels 6 and 108 have been installed to cover a surface so that three panels 6 running lengthwise are connected end-to-end by clips 84. Two panels 108 are attached to panels 6 with a panel 108 on either end of the three-panel span using clips 84. Panels 108 are connected to other panels 108 using clips 84 so that a total of five panels 108 are attached vertically on either end of the surface. Panels 108 are oriented so that channels 110 run parallel to channels 32 of panels 6. Each channel 32 substantially aligns with a channel 110. Panels 108 are attached using clips 84 fastened to the surface as necessary. Once the array of panels 6 and 108 is in place, transporters 160 and 162 are deposited into panels 6 and 108. Transporters 160 and 162 are flexible tubing used in radiant heating and cooling systems. Transporter 160 forms a first circuit of tubing and transporter 162 forms a second circuit of tubing. Transporters 160 and 162 are configured entering the panel array at the end of a directional-change panel 108. The transporters 160 and 162 turn and enter panels 108 by changing direction roughly 90 degrees. Transporter 160 continues into panels 6 from panel 108 and runs through the length of three adjacent panels 6. Transporter 160 turns approximately 90 degrees in two consecutive intersections 116 of panel 108 to complete a 180-degree turn and re-enters channels 32 of panels 6. Transporters 160 and 162 are placed within channels of the panel array in the same manner until the desired length of transporters 160 and 162 have been placed. The return ends of transporters 160 and 162 exit the panel array through a direction change panel 108. The panel array can then be covered by drywall, brick, stone, or another surface covering to complete the installation.

Figure 8A:
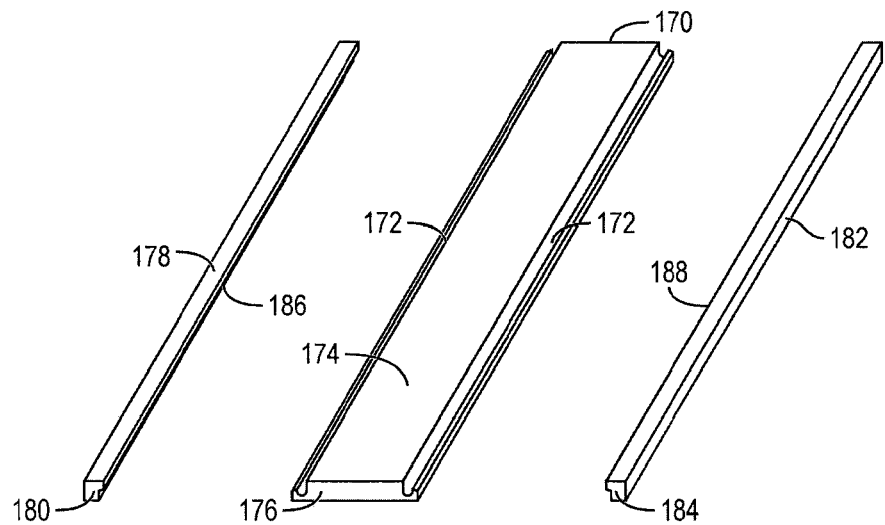
FIGS. 8a-8g illustrate a base delivery panel.
Figure 8B:
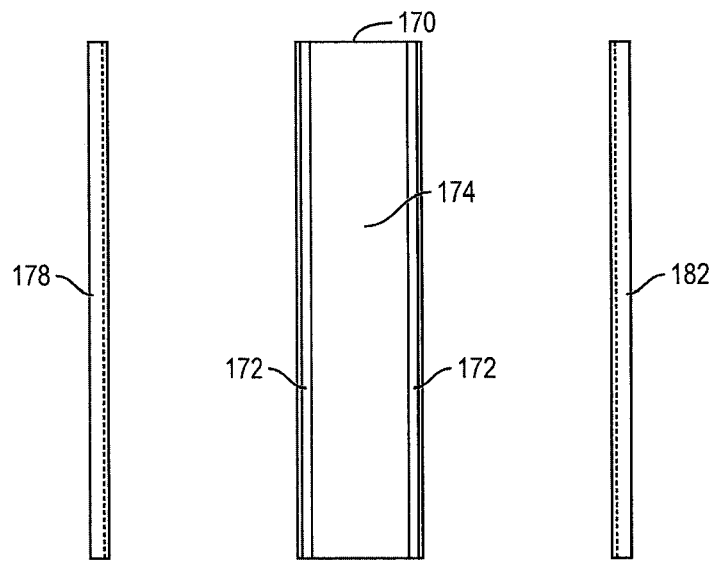

In another embodiment panels 170 have a channel structure as shown in FIGS. 8a-8g. In FIG. 8a, panel 170 is shown exploded. The shape of panel 170 is rectangular for ease of installation and manufacturing. Panel 170 has channels 172 running lengthwise on either side of center surface 174. Surface 176 is perpendicular to surface 174 and marks the end of panel 170 and channels 172. Channels 172 are shaped to hold a transporter in place when combined with panel wing 178. Panel wing 178 has end surface 180 that is parallel to surface 176. Panel wing 182 mirrors panel wing 178 and fits on the opposite side of panel 170. Panel wing 182 has end surface 184 parallel to surface 176. Panel wings are oriented so that when edge surfaces 186 and 188 are mounted to panel 170 the surface of channels 172 and edge surfaces 186 and 188 hold a transporter securely. FIG. 8b is a plan view of panel 170. The bottom surfaces of channels 172 protrude outward from center surface 174. Panel wings 178 and 182 join panel 170 along channels 172 with the top surface of panel wings 178 and 182 slightly overhanging a portion of channel 172. Panel wings 178 and 182 serve as insulation to reduce lateral transfer of thermal energy.

Generally, a rectangular or square shape for panel 170 is more convenient due to an abundance of straight lines and right angles in modern building design. However, in alternative embodiments an overall shape of a panel may be something other than rectangular or square, e.g., circular, trapezoidal, hexagonal, or some other shape. In FIG. 8a, dimensions of panel 170 are about four feet (48 inches) lengthwise by 11 inches breadthwise, but other panel sizes are contemplated. Sizes and configurations of panel 170 are selected to facilitate easy installation between floor joists or studs.

Panel 170 is composed primarily of thermofusible expanded foam such as expanded polystyrene (EPS). Other types of thermofusible expanded foams suitable for use in panel 170 include extruded polystyrene (XPS), polymethacrylimide low and high density rigid foam, flexible expanded polypropylene foam, polyisocyanurate foam, and polyurethane foam. Although a thermofusible expanded foam such as EPS is preferred for panel 170, other example embodiments may utilize any thermally insulating material. When used in heating and cooling systems, the insulating material limits the loss of thermal energy to the rear and sides of panel 170. In addition, the insulating material acts as an infiltration barrier that limits the movement of air currents through the panel. Reduced heat loss to air convection results in improved efficiency and energy requirements.

Center surface 174 of panel 170 is coated with an emitter material or thermal transfer medium such as metal, wood, plastic, graphite, polymer, thermal transfer paste, thermal transfer film, or other medium to alter the surface characteristics of panel 170. Emitter material is generally applied before panel 170 is mounted. The emitter material can be applied by spraying, sticking, gluing, taping, rolling, fusing, or otherwise attaching the emitter material to surfaces of panel 170. In heating and cooling applications the emitter material is selected to enhance the thermal absorption or emission of panel 170.

Figure 8C:
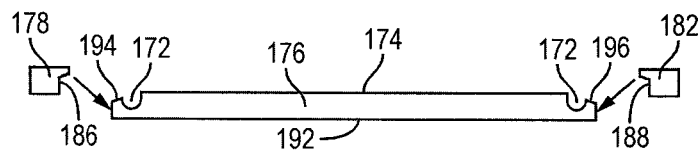
Figure 8D:
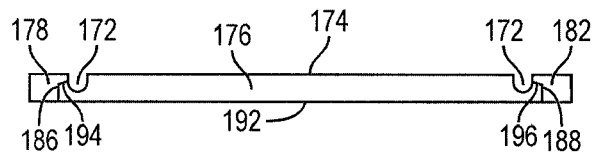

FIGS. 8c-8d show panel 170 as viewed from surface 176. End surfaces of panel wings 178 and 182 are substantially coplanar with surface 176 of panel 170. Panel wings 178 and 182 are mounted to panel 170 so that the top surface of panel wings 178 and 182 are substantially parallel with top surface 174 and the bottom surface of panel wings 178 and 182 are substantially parallel with bottom surface 192 when the panel wings are in a closed configuration. The top surfaces of panel wings 178 and 182 and surface 174 can slightly overhang channel 172 so that the opening between panel wings 178 and 182 and surface 174 is smaller than the width of channel 172 at the widest point. The circular profiles of channels 172 are extended by surface 186 of panel wing 178 and surface 188 of panel wing 182 when panel wings 178 and 182 join panel 170 along edges 194 and 196. The shape of channel 172 is chosen to hold a transporter having a circular cross section. When panel wings 178 and 182 are configured as shown in FIG. 8d, a round transporter is held snuggly in place in channel 172.

Figure 8E:
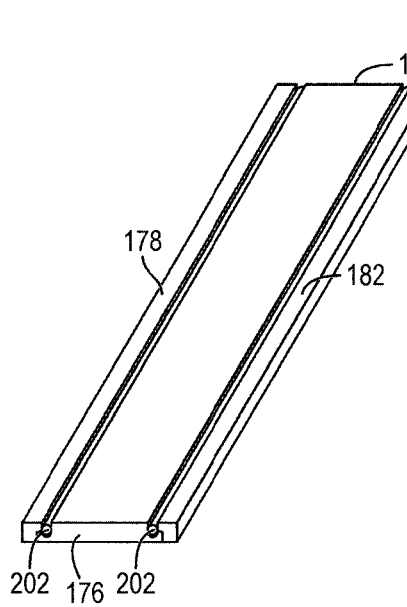
Figure 8F:
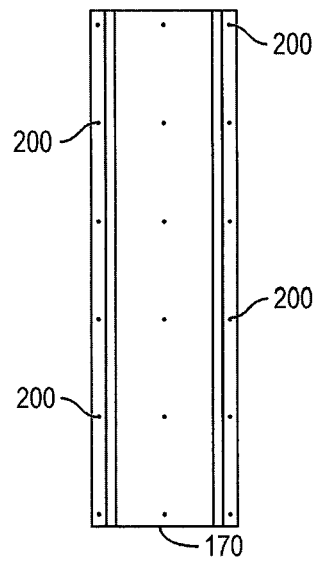
Figure 8G:
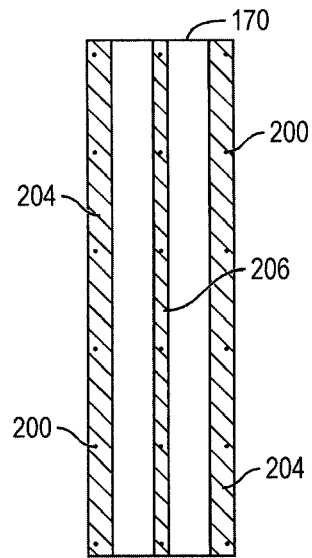

FIGS. 8e-8f depict panel 170 with panel wings 178 and 182 attached. Transporter 202 is held in channels 172 by pressure applied by the surface of channel 172 and panel wings 178 and 182. Fasteners 200 can be preplaced in panel 170 for ease of installation. FIG. 8g depicts the back side of panel 170. The back surface of panel 170 is substantially parallel to center surface 174. Panel wings 178 and 182 are attached to the edge of panel 170 by hinge material 204. Hinge material 204 can be thermofusible foam, metal, tape, plastic, or other material allowing panel wings 178 and 182 to pivot open and closed. Center attachment strip 206 is an optional component that adds strength along the length of the panel and prevents fasteners from pulling through panel material over time.

Figure 9A:
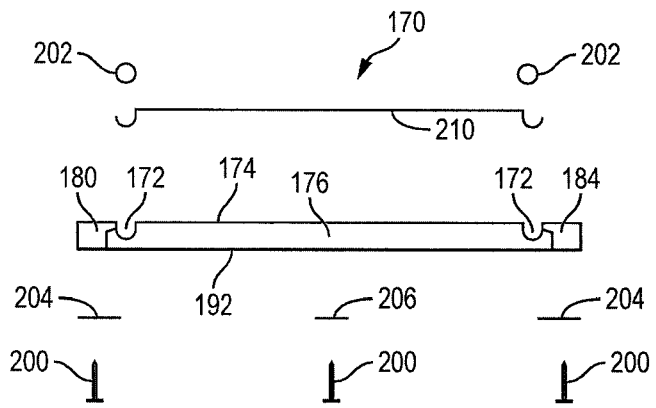
FIGS. 9a-9b illustrate the components of a base delivery panel in greater detail.
Figure 9B:
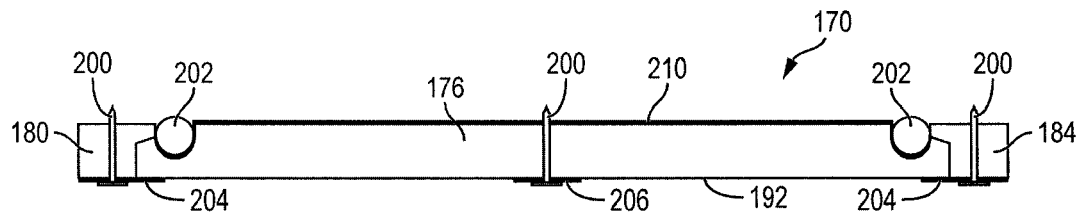

FIG. 9a shows components of panel 170 exploded and viewed from surfaces 176, 180, and 184. Panel 170 is composed of optional fasteners 200, hinges 204, attachment strip 206, panel wings 178 and 182, and emitter material or thermal transfer medium 210. Emitter material or thermal transfer medium 210 can be composed of aluminum, copper, steel, wood, plastic, foam, thermally conductive adhesives or films, expanded graphite, graphite conductive polymers, graphite conductive gels, thermally conductive foam fillers, thermally conductive paint, peel and stick thermal transfer films, or other materials that conduct heat or augment radiation transmission and absorption. Emitter material is placed over surface 174 and channels 172 in FIG. 9a but may be placed over other surfaces of panel 170. Transporter 202 is placed over emitter material 210 and into channels 172. FIG. 9b shows panel 170 assembled with transporter 202 inserted into channel 172.

Figure 10A:
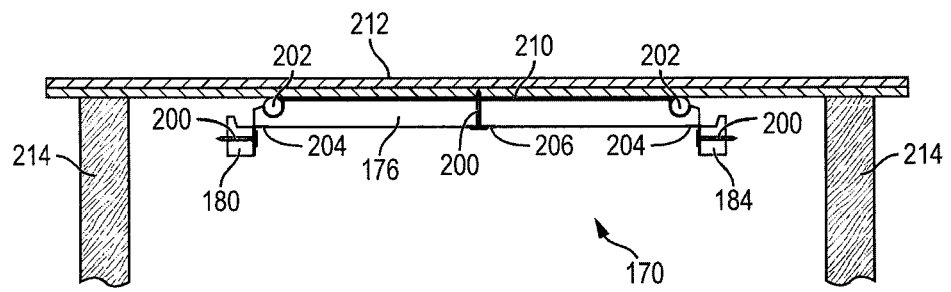
FIGS. 10a-10c illustrate the process of installing base delivery panels between floor joists or ceiling joists.
Figure 10B:
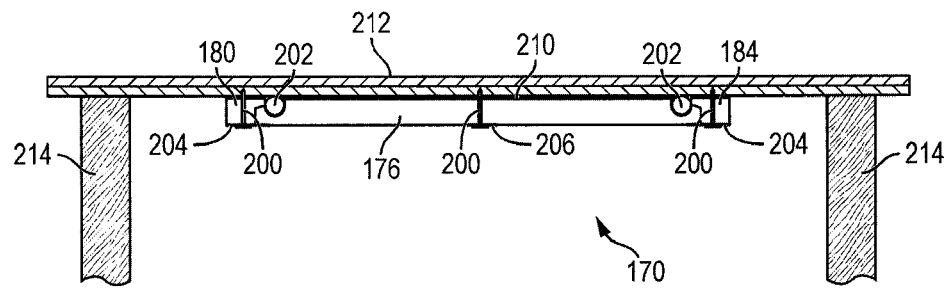
Figure 10C:
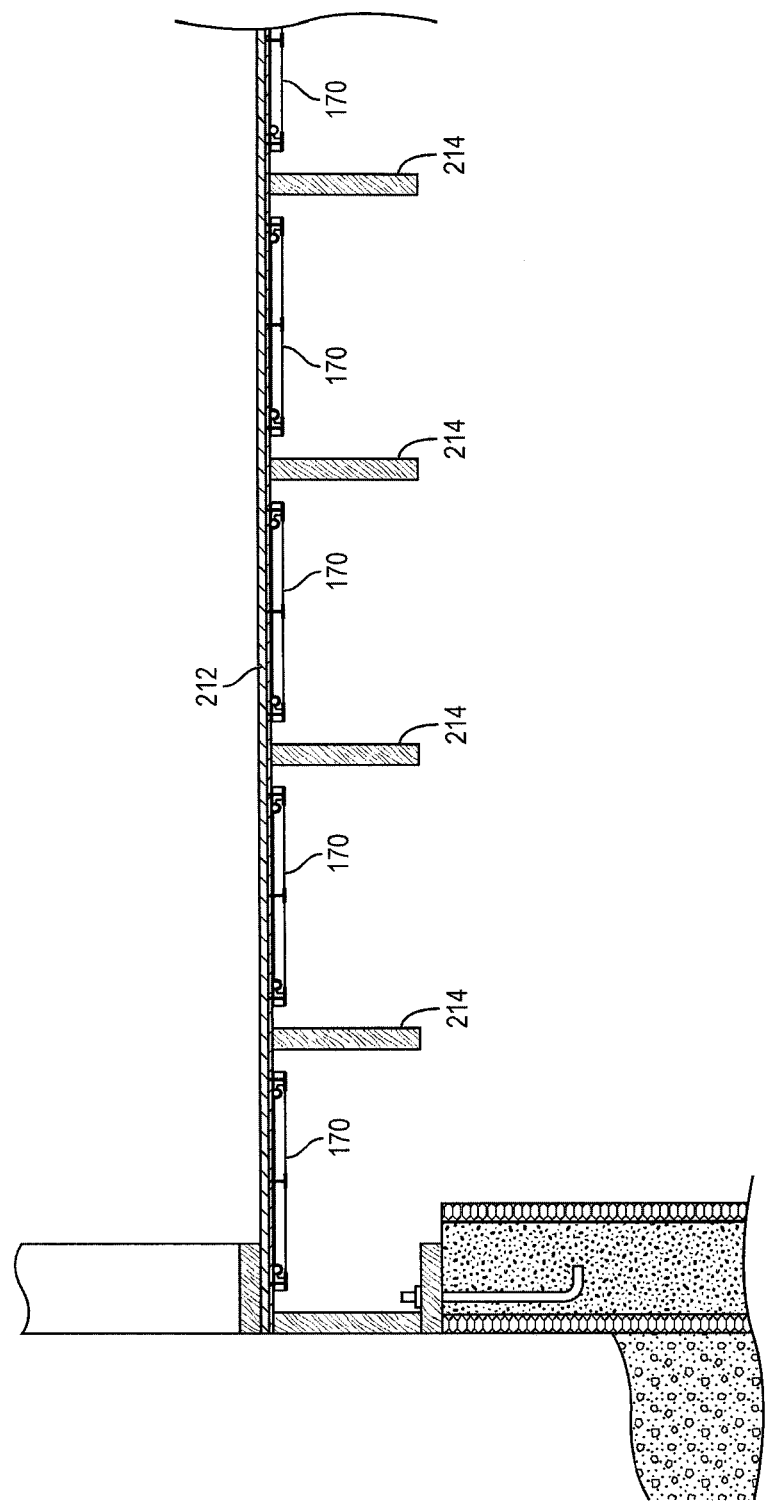

Panel 170 can be installed beneath a floor or over a ceiling on any level of a structure to provide radiant heating and cooling to adjacent space, as shown in FIGS. 10a-10c. Panel 170 is mounted to subfloor 212 and between floor joists 214 by securing fastener 200 through attachment strip 206 and panel 170 and into subfloor 212. Panel 170 can be mounted to a ceiling of a lower floor to provide heating or cooling to the next floor up. For example, panel 170 is mounted to the ceiling of the first floor to condition the space on the second floor. The width of panel 170 can be selected so that one panel fits between successive floor joists or so that multiple panels fit between floor joists. Panel wings 178 and 182 are opened along hinges 204 so that surfaces 180 and 184 are moved away from surface 176. A highly breathable, reflective skin surfacing layer can be applied to back surface 192 of panel 170 to act as a radiant barrier and hinge that reflects long-wave energy. Transporter 202 is inserted into channel 172. Center surface 174 of panel 170 faces upwards toward subfloor 212 with emitter material 210 between subfloor 212 and surface 174. The back of panel 170 serves as a thermal barrier to prevent heat transfer to the area beneath subfloor 212. After transporter 202 is inserted into channel 172, panel wings 178 and 182 are moved into closed position and secured by fasteners 200 inserted through hinge 204 and panel wings 178 and 182 and into subfloor 212, as shown in FIG. 10b. Transporter 202 is slightly proud of surface 174 when panel 170 is not mounted to subfloor 212 so that transporter 202 is pressed snuggly into channel 172 once panel 170 is mounted to subfloor 212 with wings 178 and 182 in the closed configuration.

Figure 11A:
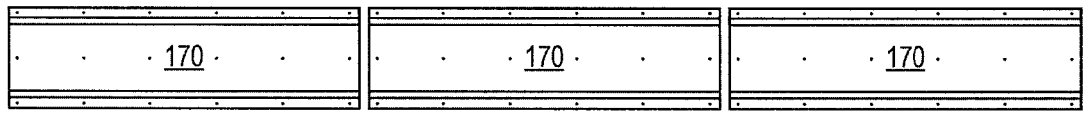
FIGS. 11a-11g illustrate multiple base delivery panels joined together by hinges.
Figure 11B:
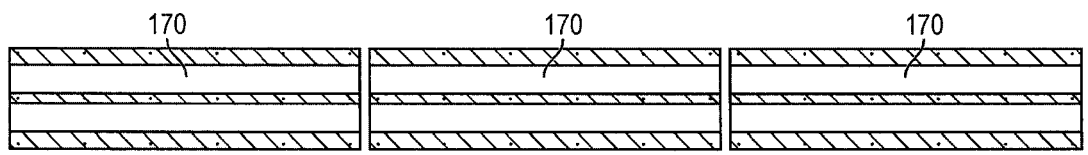
Figure 11C:
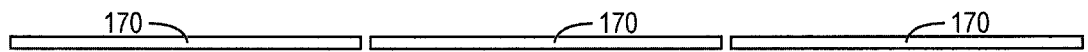

FIG. 10c shows several panels 170 mounted to subfloor 212. Panels 170 are selected so that one panel fits between each consecutive floor joist 214. Panel 170 serves as an insulation barrier so that thermal energy does not escape into the unconditioned area beneath subfloor 212. Thermal efficiency is increased by minimizing unwanted heat transfer between the heating or cooling system and unconditioned space. Panels 170 can be arranged end to end so that transporter 202 is routed through channels 172 of multiple panels 170, as shown in FIGS. 11a-11c.

Figure 11D:
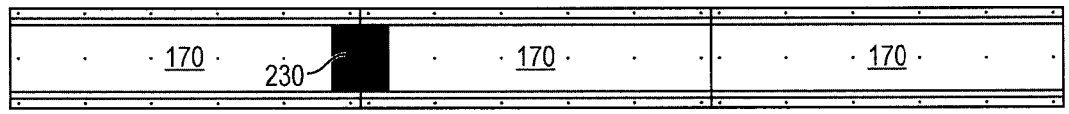
Figure 11E:
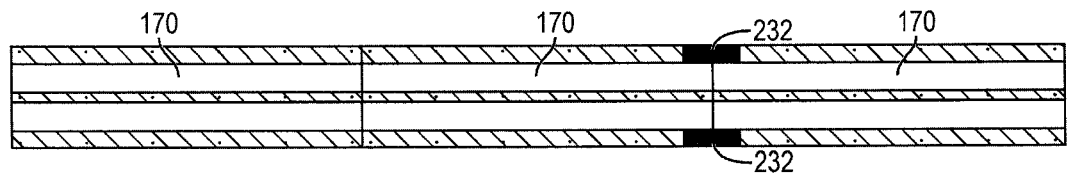
Figure 11F:
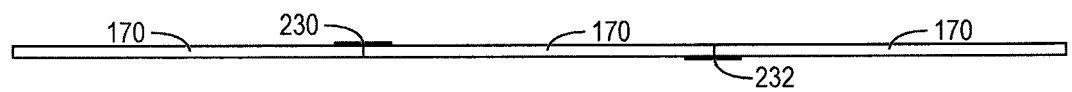
Figure 11G:
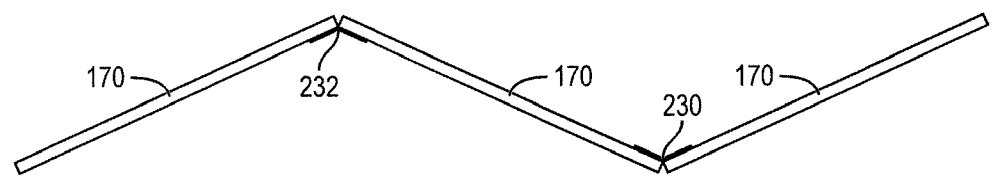

Panels 170 are arranged end to end with surface 174 of each panel facing the same direction. Surfaces 174 of panels 170 are substantially coplanar when panels are aligned on a flat surface such as subfloor 212. Hinge 230 is attached so that the surfaces 174 of two panels 170 are joined by hinge 230, as shown in FIG. 11d. FIG. 11e shows hinge 232 attached to back surfaces of two panels 170 so that panels 170 are joined together. Hinges 230 and 232 are on opposite sides of panels 170 so that panels 170 can fold in opposite directions, as shown in FIG. 11g. Panels 170 fold until surfaces of panels 170 are substantially parallel. Panels 170 are arranged in the folded configuration for ease of transportation. For installation, panels 170 are oriented in the flat, open configuration of FIG. 11f.

Figure 12A:
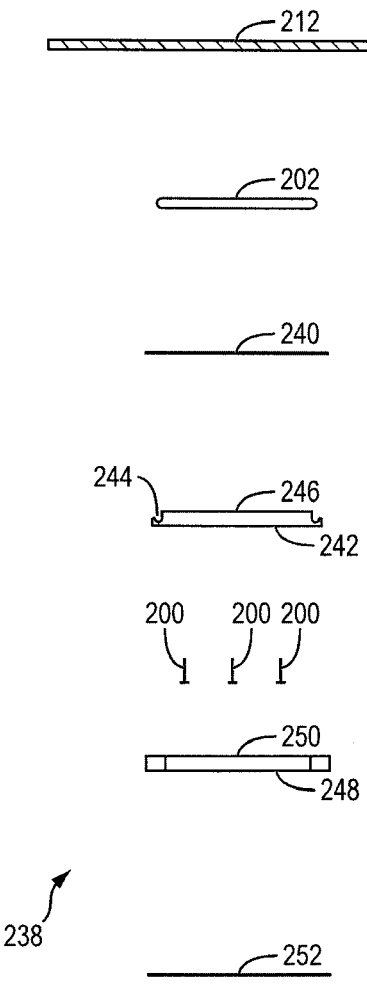
FIGS. 12a-12c illustrate a direction change panel installed between floor joists or ceiling joists.
Figure 12B:
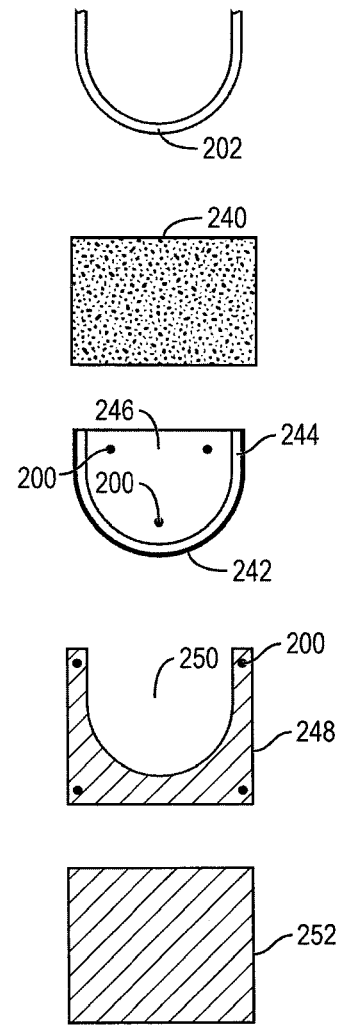
Figure 12C:
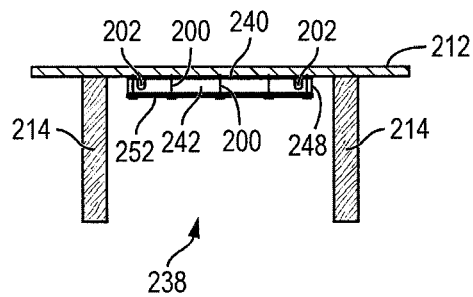

FIGS. 12a-12c illustrate directional change panel 238 for use with panel 170. Generally, a rectangular or square shape for panel 238 is more convenient due to an abundance of straight lines and right angles in modern building design. However, in alternative embodiments the shape of a panel may be nonrectangular such as circular, trapezoidal, or hexagonal. Sizes and configurations of panel 238 are selected to facilitate easy installation between floor joists or studs and to interact with panels 170.

Panel 238 is composed primarily of thermofusible expanded foam such as expanded polystyrene (EPS). Other types of thermofusible expanded foams suitable for use in panel 238 include extruded polystyrene (XPS), polymethacrylimide low and high density rigid foam, flexible expanded polypropylene foam, polyisocyanurate foam, and polyurethane foam. Although a thermofusible expanded foam such as EPS is preferred for panel 238, other example embodiments may utilize any thermally insulating material. When used in heating and cooling systems, the insulating material limits the loss of thermal energy to the rear of panel 238. Panel 238 is coated with an emitter material such as metal, wood, plastic, graphite, expanded graphite, graphite conductive polymer, graphite conductive gel, polymer, thermal transfer paste, thermal transfer film, or other medium to improve heating and cooling performance. In heating and cooling applications the surface material is selected to enhance the thermal absorption or emission of panel 238.

FIG. 12a shows the components of panel 238 from an elevation view. Emitter material or thermal transfer medium 240 has a substantially square shape matching the shape of panel 238. Emitter material 240 covers the top surface 246 of panel 238. Transporter 202 presses over the top of emitter material 240 into channel 244 and against subfloor 212 when panel 238 is mounted to subfloor 212. Emitter material 240 can be composed of aluminum, copper, steel, wood, plastic, foam, thermally conductive adhesives or films, expanded graphite, graphite conductive polymers, graphite conductive gels, thermally conductive foam fillers, thermally conductive paint, peel and stick thermal transfer films, or other surface materials that conduct heat. Direction change cap 242 receives transporter 202 in channel 244.

FIG. 12b shows components of panel 238 from a plan view. Direction change cap 242 has a U shape and channel 244 that follows the outer edge of direction change cap 242 to support transporter 202 through a turn along the curved segment of channel 244. Insulation cap 248 fits over direction change cap 242 so that the edge of U shaped cutout 250 presses against the edge of direction change cap 242. Transporter 202 inserted into channel 244 is held into place between direction change cap 242 and insulation cap 248. Insulation cover 252 is placed over direction change cap 242 and insulation cap 248 for support and to provide a thermal barrier. Insulation cover 252 can be pre-attached to insulation cap 248 or can be part of the same material so that insulation cover 252 and insulation cap 248 are not separated during manufacturing. A pre-attached configuration offers ease of installation and support while mounting direction change panel 238. Fasteners 200 hold direction change panel 238 in place.

Direction change panel 238 is mounted to subfloor 212 as shown in FIG. 12c. Direction change cap is mounted with emitter material 240 between direction change cap 242 and subfloor 212. Transporter 202 is inserted into channel 244 after direction change cap 242 is mounted and rests over emitter material 240 in channel 244. Fasteners 200 pass through direction change cap 242 and emitter material 240 and attach to subfloor 212. Insulation cap 248 and insulation cover 252 are mounted over direction change cap 242 so that entire panel 238 is affixed beneath subfloor 212. Additional fasteners 200 are used to affix insulation cap 248 and insulation cover 252 over direction change cap 242.

Figure 13A:
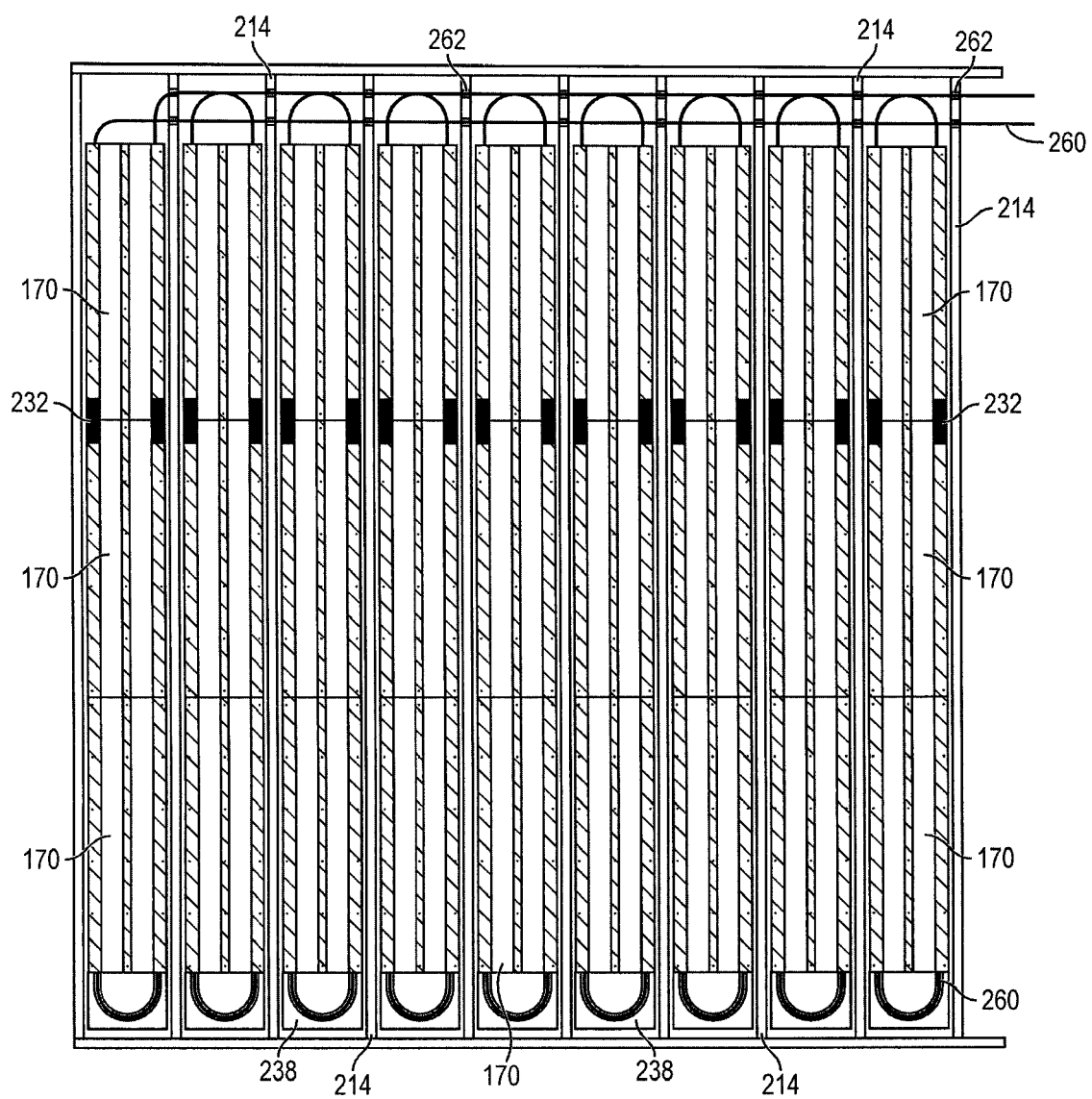
FIGS. 13a-13b illustrate the finished process of mounting base delivery panels and direction change panels between floor joists or ceiling joists to create a radiant heating system.
Figure 13B:
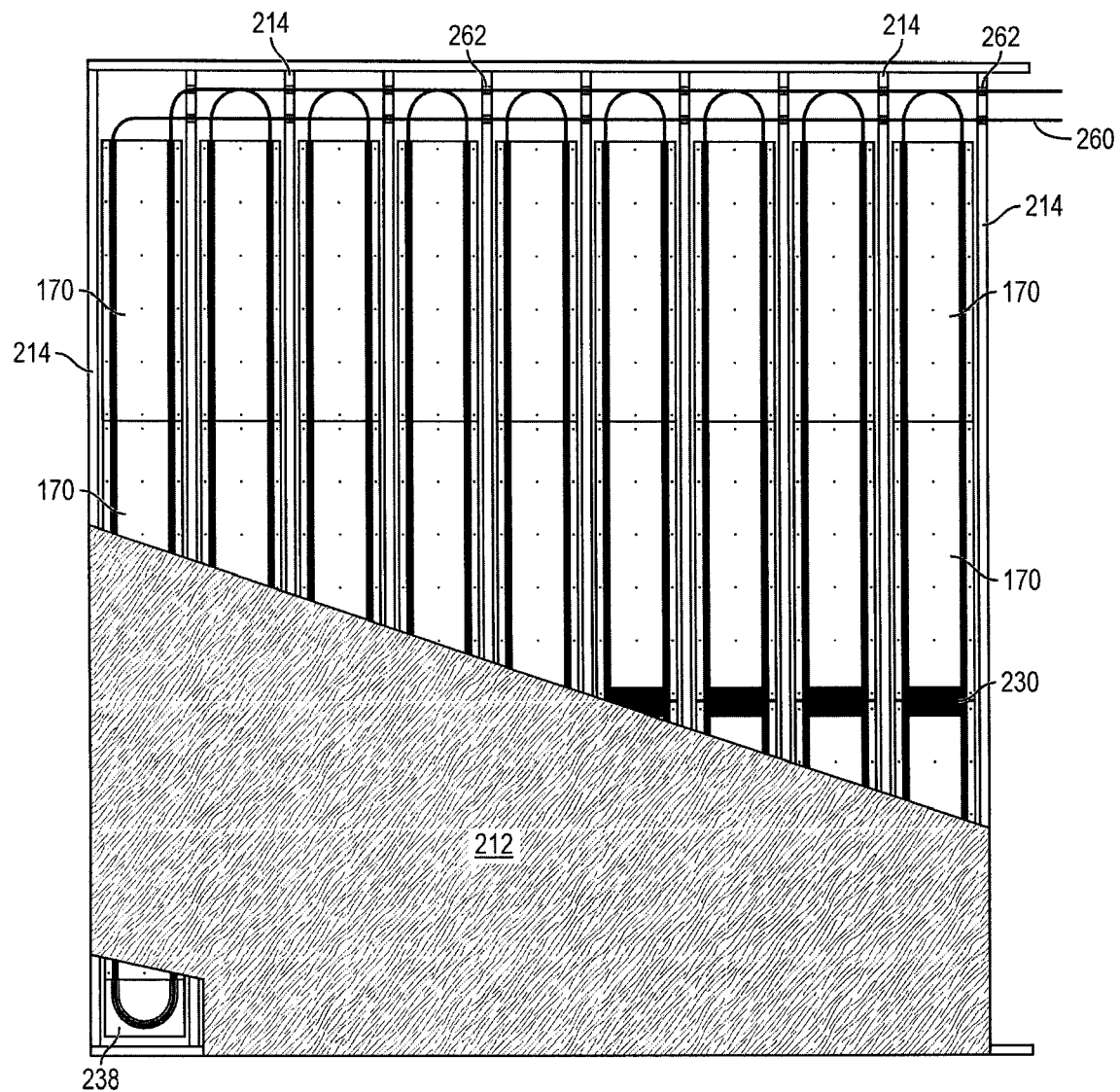

Continuing from FIGS. 10c and 12c, FIG. 13a illustrates the installation of a panel system beneath subfloor 212 including panels 170 and 238. Panels 170 and 238 are mounted between floor or ceiling joists 214. Panels 170 are mounted with radiant barrier hinge material or hinges 204 and optional attachment strip 206 facing away from subfloor 212. Three panels 170 are attached end to end by hinges 230 and 232, arranged in a coplanar configuration, and fastened to subfloor 212 by fasteners 200. Transporter 202 is routed through channels 172 of panels 170 to form circuit 260. Circuit 260 enters the array of panels through entry and exit holes 262 in floor joists 214. Circuit 260 enters direction change panel 238 upon reaching the end of panel 170. Direction change panel 238 is mounted with insulation cover 252 facing outward, away from subfloor 212. Insulation cover 252 is illustrated as transparent to show transporter 202 changing direction and re-entering the opposite channel 172 of panel 170. FIG. 13b illustrates the top portion of panels 170 and 238. Subfloor 212 is cutaway to reveal surface of emitter material 210 and 240 covering the majority of the surfaces of panels 170 and 238 that face subfloor 212. Hinge 230 is shown joining panels 170 together. Transporter 202 is placed back and forth in channels 172 of panel 170 making a U-shaped turn in direction change panel 238 at the end of panel 170 and a crisscrossed turn at the other end of panel 170 until circuit 260 is installed.

While one or more example embodiments have been illustrated and described in detail, the skilled artisan will appreciate that modifications and adaptations to those embodiments may be made without departing from the scope of the present invention as set forth in the following claims.

What is claimed:

1. A panel system, comprising:
   a first panel including a thermally insulating material;
   a first panel wing attached to the first panel, wherein the first panel and first panel wing define a first channel;
   a hinge material connected to the first panel and first panel wing;
   a flexible tubing disposed in the first channel; and
   a thermal transfer medium disposed over a surface of the first panel and thermally connected to the flexible tubing.

2. The panel system of claim 1, further including:
   a second panel disposed adjacent to the first panel; and
   a second channel formed in the second panel and aligned with the first channel.

3. The panel system of claim 2, further including a second hinge attached to the first panel and second panel.

4. The panel system of claim 1, further including a second channel formed in the first panel.

5. The panel system of claim 1, wherein the flexible tubing is slightly proud of the surface of the first panel.

6. The panel system of claim 1, further including a second panel disposed adjacent to the first panel and including a U shaped channel.

7. A panel system, comprising:
   a first panel including a thermally insulating material;
   a first panel wing disposed adjacent to the first panel;
   a first hinge attached to the first panel and first panel wing; and
   a tubing disposed between the first panel and first panel wing.

8. The panel system of claim 7, wherein the tubing is slightly proud of a surface of the first panel.

9. The panel system of claim 7, wherein the first panel and first panel wing define a channel.

10. The panel system of claim 7, further including a clip to retain the tubing.

11. The panel system of claim 7, further including a channel formed in the first panel.

12. The panel system of claim 7, further including:
    a second panel disposed adjacent to the first panel; and
    a second hinge disposed on the first panel and second panel.

13. The panel system of claim 12, wherein the second panel includes a channel aligned with the tubing.

14. A panel system, comprising:
    a first panel including a thermally insulating material;
    a first channel formed in the first panel;
    a keyway formed along the first channel with a width of the keyway greater than a width of the first channel; and
    a clip disposed in the keyway.

15. The panel system of claim 14, further including a tubing disposed within the first channel and retained by the clip.

16. The panel system of claim 14, further including a thermal transfer medium disposed over a surface of the first panel.

17. The panel system of claim 14, wherein the clip includes:
    a base; and
    a retaining member extending from the base.

18. The panel system of claim 14, further including:
    a second panel disposed adjacent to the first panel; and
    a hinge attaching the first panel to the second panel.

19. The panel system of claim 14, further including:
    a second panel disposed adjacent to the first panel; and
    a second channel formed in the second panel and aligned with the first channel.

20. A method of making a panel system, comprising:
    providing a first panel including a thermally insulating material;
    providing a first panel wing attached to the first panel, wherein the first panel and first panel wing define a first channel;
    connecting a hinge material to the first panel and first panel wing;
    disposing a flexible tubing in the first channel; and
    disposing a thermal transfer medium over a surface of the first panel and thermally connected to the flexible tubing.

21. The method of claim 20, further including disposing the first panel over a mounting surface with the flexible tubing contacting the mounting surface.

22. The method of claim 21, further including:
    providing a second panel including a second channel formed in the second panel; and
    disposing the second panel over the mounting surface with the flexible tubing in the second channel.

23. The method of claim 20, further including disposing a clip in the first channel.

24. The method of claim 20, further including:
    forming a second channel in the first panel and intersecting with the first channel; and
    disposing the flexible tubing in the second channel.

* * * * *